US010148912B1

(12) United States Patent
Oliver et al.

(10) Patent No.: US 10,148,912 B1
(45) Date of Patent: Dec. 4, 2018

(54) USER INTERFACE FOR COMMUNICATIONS SYSTEMS

(71) Applicant: Amazon Technologies, Inc., Seattle, WA (US)

(72) Inventors: Brian Alexander Oliver, Seattle, WA (US); Tony Roy Hardie, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/633,122

(22) Filed: Jun. 26, 2017

(51) Int. Cl.
| *H04N 7/15*  | (2006.01) |
| *H04M 3/56*  | (2006.01) |
| *H04N 7/14*  | (2006.01) |
| *G06F 3/01*  | (2006.01) |
| *H04L 12/18* | (2006.01) |
| *H04L 29/06* | (2006.01) |

(52) U.S. Cl.
CPC ............... *H04N 7/152* (2013.01); *G06F 3/01* (2013.01); *H04M 3/563* (2013.01); *H04N 7/147* (2013.01); *H04N 7/15* (2013.01); *H04L 12/18* (2013.01); *H04L 29/06027* (2013.01); *H04M 3/567* (2013.01)

(58) Field of Classification Search
CPC .......... H04N 7/152; H04N 7/147; H04N 7/15; H04M 3/563; H04M 3/567; G06F 3/01; H04L 29/06027; H04L 12/18
USPC .................. 348/14.08, 14.09; 370/260–271; 379/202.01–206.01; 709/204
See application file for complete search history.

(56) References Cited

U.S. PATENT DOCUMENTS

| 2008/0218582 A1* | 9/2008  | Buckler ................... H04N 7/15 348/14.08 |
| 2012/0281057 A1* | 11/2012 | Couse .................... H04N 7/147 348/14.03 |
| 2013/0091205 A1* | 4/2013  | Kotler ................. H04L 65/4015 709/204 |
| 2013/0156204 A1* | 6/2013  | Schulz .................. H04M 3/569 381/56 |
| 2014/0085406 A1* | 3/2014  | Narayanan ............. H04N 7/152 348/14.09 |
| 2016/0012827 A1* | 1/2016  | Alves ..................... H04R 3/005 381/71.1 |
| 2017/0293458 A1* | 10/2017 | Poel ...................... G06F 3/1454 |
| 2017/0364481 A1* | 12/2017 | Scapa ................... G06F 17/211 |

* cited by examiner

*Primary Examiner* — Stella Woo
(74) *Attorney, Agent, or Firm* — Lee & Hayes, PC

(57) ABSTRACT

This disclosure describes techniques for providing lighting indications in speech-based systems. For instance, a remote system may receive, from a conferencing system, a first message indicating that a first electronic device is participating in a conference call with at least a second electronic device and a third electronic device. The remote system can then associate the second electronic device with a first visual indication, and then cause the first electronic device to display the first visual indication. The remote system can further associate the third electronic device with a second visual indication, and then cause the first electronic device to display the second visual indication. Additionally, the remote system may receive a second message indicating that the first electronic device disconnected from the conference call and, in response, cause the first electronic device to cease from displaying the first visual indication and the second visual indication.

20 Claims, 24 Drawing Sheets

| DEVICE IDENTIFIER | COMMUNAL ACCOUNT IDENTIFIER | USER ACCOUNT IDENTIFIER | DEVICE TYPE |
|---|---|---|---|
| 111.xxx | 111.yyy | - | SHARED |
| 222.xxx | 111.yyy | 222.zzz | NON-SHARED |
| 333.xxx | 111.yyy | 333.zzz | NON-SHARED |
| 111.aaa | 111.bbb | - | SHARED |
| 222.aaa | 111.bbb | 222.ccc | NON-SHARED |
| 333.aaa | 111.bbb | 333.ccc | NON-SHARED |
| ZZZ.777 | ZZZ.888 | ZZZ.999 | NON-SHARED |

FIG. 17

USER INTERFACE FOR COMMUNICATIONS SYSTEMS

BACKGROUND

Users are now able to interact with electronic devices through speech. For instance, a user can provide an electronic device with one or more commands or other input using speech. The user can further utilize the electronic device to communicate with other users of other electronic devices. For instance, the users may be participating in a conference call in which each of the users is utilizing a respective electronic device to send and receive messages. A system that is remote from the electronic devices can organize the conference call by sending and receiving the messages between the electronic devices. Provided herein are technical solutions for, among other things, improving the ability of one or more of the users to determine when another user connects and/or disconnects from the conference call.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 17 illustrates an exemplary communications table.

DETAILED DESCRIPTION

Figure 1:
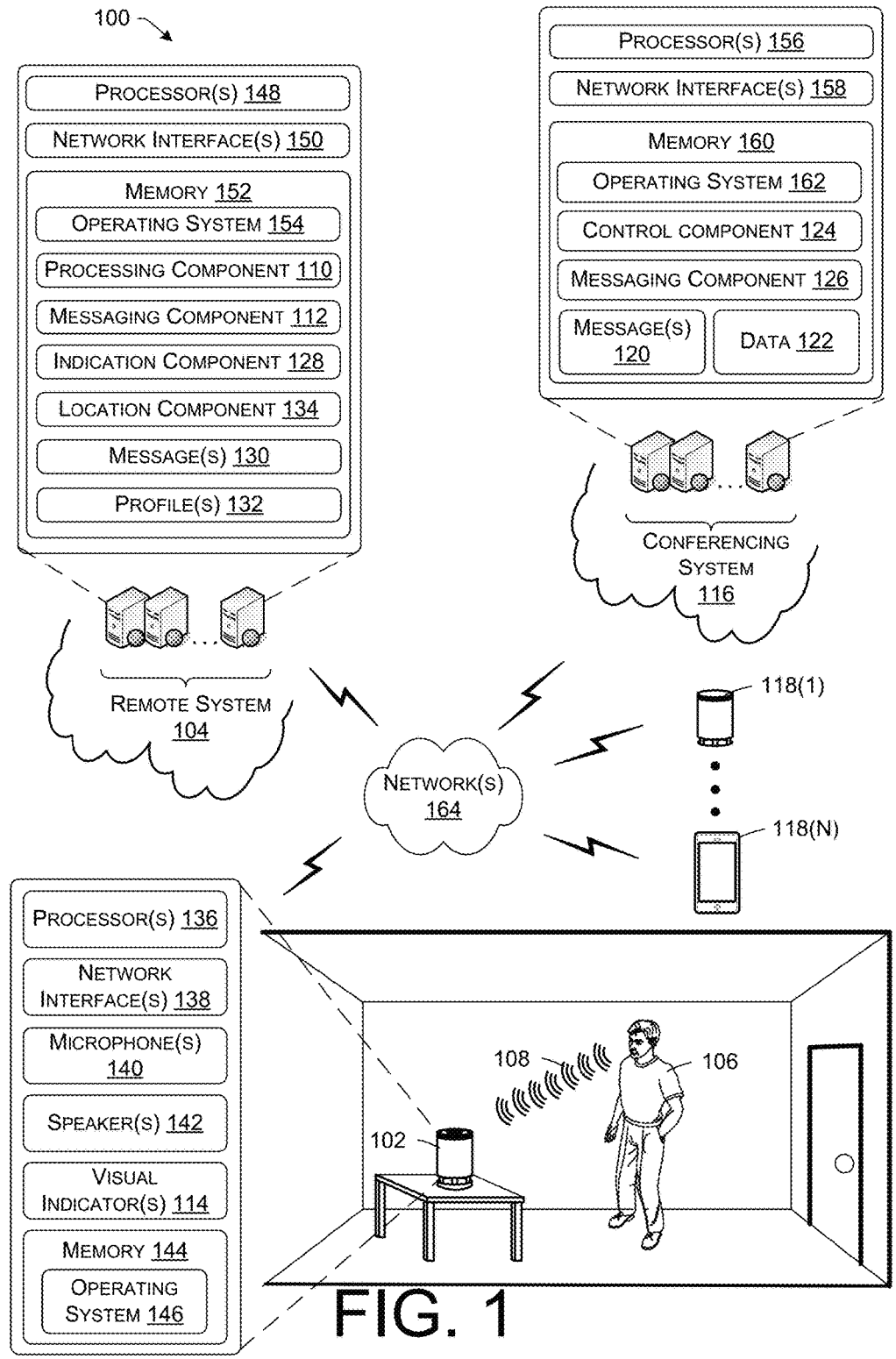
FIG. 1 illustrates a schematic diagram of a user utilizing an electronic device to participate in a conference call with one or more other users. As shown, a conferencing system can organize the conference call by sending and receiving messages between the electronic devices. Additionally, a remote system can communicate with the electronic device of the user to cause the electronic device to provide visual feedback associated with the conference call.

This disclosure describes systems and techniques for providing lighting indications in speech-based systems. For instance, a speech-based system may include one or more electronic devices associated with a network-based service that work together to interact with respective users by speech. For example, the network-based service may receive audio data representing user speech from an electronic device. The network-based service may then analyze the audio data using automated speech recognition (ASR) and natural language understanding (NLU). Based on the analysis, the network-based service may send data, such as a message, back to the electronic device that causes the electronic device to perform a function. For instance, the message may cause the electronic device to output, via one or more speakers, audible sound that is based on the user speech.

In some instances, while the user is interacting with the electronic device, a system (e.g., the speech-based system, a conferencing system, and/or any other third-party system) can cause the electronic device to display one or more visual indications to the user. Each visual indication can include a light color, a light sequence, and/or a light pattern. For instance, the electronic device can include visual indicators (e.g., light-emitting diodes (LEDs)) that emit light when activated by the electronic device. In some instances, the visual indicators may include a light ring disposed on an end (e.g., the top end) of the electronic device. In other instances, the visual indicators may be disposed at various locations on the electronic device. To cause the electronic device to display the one or more visual indications, the system can send messages to the electronic device that cause the electronic device to activate one or more of the visual indicators.

For instance, a user may be using first electronic device to participate in a conference call with one or more other users. To participate in the conference call, the first electronic device can connect with a conferencing system, such as a multipoint control unit (MCU), that bridges the first electronic device with respective electronic devices of others users participating in the conference call using a communication session. While the user is participating in the conference call, the system can receive messages indicating at least a number of a participants (e.g., electronic devices, users, or both) that are participating in the conference call, a respective identity (e.g., phone number, Internet Protocol address, etc.) associated with one or more of the electronic devices, whether an electronic device connects/disconnects from the conference call, which electronic device is currently providing data (e.g., which user is currently speaking), respective identity (e.g., name, identifier, etc.) associated with one or more users, which user is currently speaking during the conference call, or the like. In some instances, the system receives the messages from the conferencing system. In some instances, the system receives the messages from one or more of the electronic devices participating in the conference call. Still, in some instances, the system receives the messages from the speech-based system (e.g., if the system does not include the speech-based system).

Using the messages, the system can cause at least the first electronic device to display one or more visual indications associated with the conference call. For instance, the speech-based system can send the first electronic device a message that causes the first electronic device to display a visual indication indicating the number of other participants (e.g., number of electronic device and/or number of users) that are participating in the conference call. For example, if two other electronic devices are connected to the conference call with the first electronic device, the message can cause the first electronic device to activate two visual indicators concurrently to indicate that two other electronic devices are connected to the conference call. For another example, if two other electronic devices are connected to the conference, where each electronic device is being utilized by two users, the message can cause the first electronic device to activate four visual indicators concurrently to indicate that four users are participating in the conference call.

In some instances, the system can associate each participant (each electronic device and/or each user profile) with a unique visual indication. For instance, the system can associate each participant with a light color, a light pattern, and/or a light sequence that identifies the respective participant. In some instances, the system determines which visual indication to associate with each participant using one or more profiles. For instance, the system may store a profile associated with the first electronic device that indicates at least a list of contacts. The profile can further indicate, for each of one or more contacts, a specific visual indication associated with the respective contact. Thus, using the profile, the system can associate one or more participants that are participating in the conference call with respective visual indications, and send messages to the first electronic device that causes the electronic device to display the visual indications.

For example, the system can determine that the first electronic device is connected to a conference call with at least a second electronic device and a third electronic device. As such, the system can associate the second electronic device with a first visual indication. The system can then send the first electronic device a message that causes the first electronic device to display the first visual indication. Additionally, the system can associate the third electronic device with a second visual indication. The system can then send the first electronic device a message that causes the first electronic device to display the second visual indication concurrently with the first visual indication. In some instances, the system uses the profile associated with the first electronic device to associate the electronic devices with the respective visual indications.

In some instances, the system can further cause the first electronic device to display visual indications indicating when an electronic device connects to the conference call, an electronic device disconnects from the conference call, a user joins the conference call using a respective electronic device (enters an environment that includes the electronic device), a user leaves the conference call (leaves the environment that includes the electronic device), a participant is providing audio via the conference call, or the like. For example, if a fourth electronic device connects to the conference call, the system can send the first electronic device a message that causes the first electronic device to concurrently display, with the first visual indication and the second visual indication, a third visual indication associated with the fourth electronic device. For another example, if the second electronic device disconnects from the conference call, the system can send the first electronic device a message that causes the first electronic device to cease from displaying the first visual indication associated with the second electronic device. Furthermore, if the third electronic device is sending data, such as by a user of the third electronic device speaking during the conference call, the system can send the first electronic device a message that causes the first electronic device to alter the second visual indication associated with the third electronic device (e.g., cause it to blink in a pattern, turn a different color, etc.).

In some instances, the system can further cause the first electronic device to display visual indications based on outside messages (e.g., text messages, voice messages, reminders, social networking messages, etc.) that the system receives during the conference call. For instance, during the conference call, the system can receive, from a fourth electronic device, an outside message that is directed to the user of the first electronic device. In response, the system can associate the outside message with a third visual indication. In some instances, the third visual indication is associated with outside messages that the system receives during conference calls. The system and then send the first electronic device a message that causes the first electronic device to concurrently display the third visual indication with the first visual indication and the second visual indication.

In some instances, the system can further cause the first electronic device to display a visual indication that is associated with the first electronic device and/or each of one or more users that are utilizing the first electronic device. For instance, the system can associate the first electronic device with a third visual indication. The third visual indication can include a third light color, a third light sequence, and/or a third light pattern. In some instances, the system associates the first electronic device with the same visual indication each time the first electronic device is connected to a call, such as a conference call. In other instances, the system may associate the first electronic device with a new visual indication for each call. The system can then send the first electronic device a message that causes the first electronic device to concurrently display the third visual indication with the first visual indication and the second visual indication.

In some instances, the system can continue to cause the first electronic device to display one or more visual indications while the first electronic device is connected to the conference call. If the first electronic device disconnects from the conference call, the system may receive a message indicating that the first electronic device has disconnected. In some instances, the system can receive the message from the conferencing system. Additionally, or alternatively, in some instances, the system can receive the message from the first electronic device (and/or one or more of the other electronic devices connected to the conference call). The system can then send the first electronic device a message that causes the first electronic device to cease from displaying visual indications (e.g., the first visual indication and the second visual indication) associated with the conference call.

In some instances, the system can further cause the first electronic device to display visual indications indicating locations of users. For instance, the system can receive data that represents user speech from a second electronic device and analyze the data to determine a location of a user with respect to the second electronic device (e.g., using Beamforming). Based on the location, the system can cause the first electronic device to display a visual indication that indicates the location of the user with respect to the second electronic device. For instance, if the user is sitting to a north side of the second electronic device, the system can send the first electronic device a message that causes at least one visual indicator located on the north side of the first electronic device to display the visual indication. Additionally, if the user moves with respect to the second electronic device, the system can send the first electronic device additional messages that cause one or more other visual indicators located on the first electronic device to display the visual indication.

As described herein, messages can include any type of electronic communication that electronic devices can send and receive with other electronic devices. For instance, a message can include an email message, a short message service (SMS), multimedia messages (MMS), a voicemail message, audio data, video data, or any other type of electronic communication that an electronic device can send to another electronic device. In some instances, an electronic device may use messages to send indications, notifications, alerts, and/or requests to another electronic device. Additionally, in some instances, an electronic device may use messages to instruct (i.e., cause) another electronic device to perform a function (e.g., display visual indications).

Additionally, as described herein, a conferencing call can include an audio conferencing call or video conferencing call. In some instances, audio conferencing calls can include conferencing calls in which each electronic device is sending/receiving audio communications between one another, either directly or through one or more third-party systems (e.g., the conferencing system), but the electronic devices are not sending video data. For instance, at least one of the electronic devices (e.g., the first electronic device) may not include a display for displaying video data from other electronic devices. In some instances, video conferencing calls can include conferencing calls in which the electronic devices are sending/receiving video data (e.g., media streams) between one another, either directly or through third-party systems (e.g., the conferencing system). In some instances, a conferencing call can be configured as a centralized conference, a decentralized conference, a hybrid conference, or a mixed conference.

Furthermore, while the above describes that the speech-based system performs ASR and NLU for the first electronic devices, in some instances, the first electronic device can perform some and/or all of the ASR and NLU described above. Additionally, in some instances, the first electronic device can perform some and/or all of the functions of the system described above.

Moreover, as described herein, each visual indication can be associated with a light color, a light sequence, and/or a light pattern. The light color can include a specific color, such as red, blue, green, yellow, or the like. The light sequence can a sequence of light colors. For instance, the light sequence can include red, followed by blue, followed by green, and then repeated starting red again. The light pattern can include a flash or pulse pattern associated with the light. For instance, the light pattern can include flashing the light color every second, or changing the light color according to the light sequence every second.

FIG. 1 illustrates a schematic diagram of an example system 100 for providing lighting indications in speech-based systems. For instance, the system 100 may include at least a first electronic device 102 (also referred to as just an electronic device 102 or a user device 102) associated with a remote system 104 (e.g., speech-based system) that work together to interact with at least one user 106. For example, the remote system 104 may receive audio data representing user speech 108 from the first electronic device 102. The remote system 104 may then analyze the audio data using a processing component 110, which can process the audio data using at least ARS and NLU. Based on the analysis, the remote system 104 may use the messaging component 112 to send a message back to the first electronic device 102 that causes the first electronic device 102 to perform a function, such as outputting audio back to the user 106. Such interactions between the first electronic device 102 and the remote system 104 are described in detail with regard to FIG. 14.

In some instances, while the user 106 is interacting with the first electronic device 102, the remote system 104 can cause the first electronic device 102 to display one or more visual indications to the user 106. For instance, the first electronic device 102 can include visual indicator(s) 114 (e.g., light-emitting diodes (LEDs)) that emit light when activated by the first electronic device 102. In some instances, the visual indicator(s) 114 may include a light ring disposed on an end (e.g., the top end) of the first electronic device 102. In other instances, one or more of the visual indicator(s) 114 may be disposed at various locations on the first electronic device 102. To cause the first electronic device 102 to display the one or more visual indications, the remote system 104 can use the messaging component 112 to send messages to the first electronic device 102 that cause the electronic device to activate one or more of the visual indicator(s) 114 based on visual indications.

For instance, the user 106 may be using the first electronic device 102 to participate in a conference call with one or more other users. To participate in the conference call, the first electronic device 102 can connect with a conferencing system 116, such as a multipoint control unit (MCU), that bridges the first electronic device 102 with respective electronic devices 118(1)-(N) (referred to singly as an electronic device 118) of others users participating in the conference call. In some instances, the conferencing system 116 may establish a communications session between electronic devices using one or more VoIP protocols including, but not limited to SIP, RTP, RTCP, SRTP, and SDP. In other instances, the conferencing system 116 may establish communication sessions between the electronic devices using one or more other communication protocols.

As described herein, an electronic device may connect to the communication session by opening a communication channel with the communication session using one or more of the communication protocols. Additionally, an electronic device may disconnect from the communication session by disconnecting from the communication channel. Moreover, in some instances, the conferencing system 116 can open a communication channel with the remote system 104 once the communication session has been opened between the electronic devices. The conferencing system 116 and the remote system 104 can then send/receive data between one another through the communication channel using one or more of the communication protocols.

While the user 106 is participating in the conference call, the remote system 104 can receive message(s) 120 indicating at least a number of electronic devices participating in the conference call, a respective identity (e.g., phone number, Internet Protocol address, etc.) associated with one or more of the electronic devices, whether an electronic device connects/disconnects from the conference call, which electronic device is currently providing data (e.g., video data, audio data representing user speech), a number of users that are participating in the conference call, whether a user enter a conference call (e.g., the user enters an environment associated with an electronic device), whether a user leaves the conference call (e.g., the user leaves the environment associated with the electronic device), or the like.

For instance, the conferencing system 116 that is organizing the conference call can receive data 122 (e.g., audio data, video data, etc.) from each electronic device, and then send the data 122 to each of the other electronic devices connected to the conference call. While organizing the conference call, the control component 124 of the conferencing system 116 can identify a number of electronic devices participating (e.g., connected to) in the conference call, a respective identity associated with each of the one or more electronic devices, whether an electronic device connects/disconnects from the conference call, which electronic device is currently providing the data 122, or the like. In some instances, the conferencing system 116 can then use a messaging component 126 to send the message(s) 120 to the remote system 104. Additionally, or alternatively, in some instances, the conferencing system 116 can user the messaging component 126 to send the message(s) 120 to one or more of the electronic devices connected to the conference call, which can then send the message(s) 120 to the remote system 104.

The remote system 104 can use the indication component 128 to analyze the message(s) 120. For instance, the indication component 128 can analyze the message(s) 120 to determine a number of electronic devices 118(1)-(N) that are connected to the conference call with the first electronic device 102. Based on the number of electronic devices 118(1)-(N), the remote system 104 can cause the first electronic device 102 to display one or more visual indications to indicate the number of electronic devices 118(1)-(N). For instance, the messaging component 112 can generate and send the first electronic device 102 a message 130 that causes the first electronic device 102 to activate a number of visual indicators 114 corresponding to the number of electronic devices 118(1)-(N) connected to the conference call. For example, if two other electronic device(s) 118(1)-(N) are connected to the conference call, the message 130 may cause the first electronic device 102 to concurrently activate two visual indicators 114.

Additionally, during the conference call, the remote system 104 can receive additional message(s) 120 indicating that one or more electronic devices 118(1)-(N) have connected to or disconnected from the conference call. Based on the additionally message(s) 120, the remote system 104 can cause the first electronic device 102 to modify the display of the visual indications. For example, if the indication component 128 determines that a message 120 indicates that a new electronic device 118 connected to the conference call, the messaging component 112 can generate and send the first electronic device 102 a message 130 that causes the first electronic device 102 to display, concurrently with other displayed visual indications, a new visual indication corresponding to the new electronic device 118. For another example, if the indication component 128 determines that a message 120 indicates that an electronic device 118 disconnected to the conference call, the messaging component 112 can generate and send the first electronic device 102 a message 130 that causes the first electronic device 102 to cease the display of the visual indication corresponding to the disconnected electronic device 118.

Furthermore, during the conference call, the remote system 104 can receives additional message(s) 120 indicating that users have entered or left the conference call. Based on the message(s) 120, the remote system can cause the first electronic device 102 to modify the display of the visual indications. For example, the remote system 104 can receive a message indicating that an additional user is now using an electronic device 118 to participate in the conference call. Based on the message, the messaging component 112 can generate and send the first electronic device 102 a message 130 that causes the first electronic device 102 to display, concurrently with other displayed visual indications, a new visual indication corresponding to the new user.

In some instances, the remote system 104 can cause the first electronic device 102 to display respective visual indications that are associated with each participant of the conference call (e.g., each of the electronic devices 118(1)-(N) and/or each of the users using the electronic devices 118(1)-(N)). For instance, each time the remote system 104 receives a message 120 indicating that a participant has connected to the conference call, the indication component 128 can associate the participant with a visual indication. The visual indication can include a light color, a light pattern, and/or a light sequence that identifies the electronic device 118 to the user 106. The remote system 104 can then cause the first electronic device 102 to display the respective visual indications that are associated with each of the participants.

For example, the first electronic device 102 may be connected to a conference call with at least a second electronic device 118(1) and a third electronic device 118(N). The remote system 104 may thus use the indication component 128 to associate the second electronic device 118(1) with a first visual indication, such as a first color, and associate the third electronic device 118(N) with a second visual indication, such as a second color. The remote system 104 can then use the messaging component 112 to send the first electronic device 102 one or more message(s) 130 that cause the first electronic device 102 to display the first visual indication associated with the second electronic device 118(1) and the second visual indication associated with the third electronic device 118(N). Additionally, in some instances, the one or more message(s) 130 cause the first electronic device 102 to display the first visual indication concurrently with the second visual indication.

In some instances, the remote system 104 can utilize one or more profile(s) 132 to associate visual indications with participants. Each profile 132 may include various types of information relating to a respective user. For instance, a profile 132 associated with the user 106 may include information relating to at least preferences of the user 106 (e.g., visual indication preferences), contacts for the user 106 (e.g., phone numbers, device identifiers (IP addresses), or the like associated with other users), associations between the contacts and the preferences, configuration settings when interacting with the user 106, or the like.

To associate a participant with a visual indication, the indication component 128 can thus analyze the profile 132 of the user 106 to identify that the participant (e.g., an electronic device 118, a user of the electronic device 118, etc.) is associated with a contact of the user 106. For example, if the participant is an electronic device 118, the indication component 128 can match an identifier (e.g., phone number, IP address, etc.) associated with the electronic device 118 with an identifier associated with one of the contacts. The indication component 128 can then analyze the profile 132 to identify a visual indication that is associated with the contact. Based on the identification, the indication component 128 can associate with the electronic device 118 with the identified visual indication. As such, during a conference call, the user 106 can easily identify who is connected to the conference call based on which visual indications the first electronic device 102 is displaying to the user 106.

For example, and using the example above with the second electronic device 118(1) and the third electronic device 118(N), the profile 132 associated with the user 106 can include a first contact associated with the second electronic device 118(1) and a second contact associated with the third electronic device 118(N). The profile 132 can further indicate that the first visual indication (e.g., the first color) is associated with the first contact and that the second visual indication (e.g., the second color) is associated with the second contact. As such, during the conference call, the indication component 128 can analyze the profile 132 to determine that the second electronic device 118(1) is associated with the first contact, which is associated with the first visual indication, and associate the second electronic device 118(1) with the first visual indication in response. Additionally, the indication component 128 can analyze the profile 132 to determine that the third electronic device 118(N) is associated with the second contact, which is associated with the second visual indication, and associate the third electronic device 118(N) with the second visual indication in response.

For another example, the profile 132 can associate one or more users with visual indications. For instance, the profile 132 can include a contact for a user named John, and associate the contact with a visual indication. The indication component 128 can then determine that an electronic device 118 is being used by John and associate the electronic device 118 with the visual indication. In some instances, the remote system 104 can determine the electronic device 118 is being used by John by receiving a message 120 indicating that John is using the electronic device 118. In some instances, the remote system 104 can make the determination by analyzing data 122 sent by the electronic device 118.

For instance, the remote system 104 may receive data 122 sent by the electronic device 118 from at least one of the conferencing system 116 and/or the electronic device 118. The remote system 104 can then analyze the data 122 using one or more algorithms associated voice recognition and/or speaker identification to identify that the data 122 represents user speech from John. For instance, the remote system 104 can analyze, using voice recognition and/or speaker identification, the data 122 that represents user speech to audio data that is stored in associated with the contact for John, wherein the stored audio data represents known user speech associated with John. Based on the analysis, the remote system 104 can match a voice of the user speech as represented by the data 122 to a voice of the user speech as represented by the stored audio data. Based on the match, the remote system 104 can determine that John is currently using the electronic device 118 to participate in the conference call with the user 106. The indication component 128 can then associate with electronic device 118 with the visual indication for John.

In some instances, the remote system 104 can analyze the data 122 (e.g., a first portion of the data 112, also referred to as first data, and a second portion of the data 122, also referred to as second data, etc.) to determine that two or more users are using a single electronic device 118 and associated each of the two or more users with a respective visual indication. For instance, the remote system 104 can analyze the data 122 using one or more algorithms associated voice recognition and/or speaker identification to identify that the data 122 represents first user speech from a first user and second user speech from a second user. In some instances, the remote system 104 analyzes the data 122 using similar techniques as described above with regard to the user John. The indication component 128 can then associate with the first user with a first visual indication and the second user with a second visual indications, and cause the first electronic device 102 to concurrently display the first visual indication and the second visual indication.

Additionally, or alternatively, in some instances, when two or more users are using a single electronic device 118, the indication component 128 may associated each of the two more users with a similar visual indication. The indication component 128 can then cause the first electronic device 102 to concurrently display the visual indication of the two or more users. In such instances, by associating each of the users with the same visual indication, the user 106 can identify that multiple users are using a single electronic device 118 during the conference call. Additionally, if there is at least one additional user that is using at least one additional electronic device 118 in the conference call, the user 106 can easily distinguish between which users are using each of the electronic device 118 during the conference call based on the visual indications that the first electronic device 102 is displaying.

In some instances, the remote system 104 can continue to cause the first electronic device 102 to display one or more visual indications while the first electronic device 102 is connected to the conference call. If the first electronic device 102 disconnects from the conference call, the remote system 104 may receive a message 120 indicating that the first electronic device 102 has disconnected. In some instances, the remote system 104 can receive the message 120 from the conferencing system 116. Additionally, or alternatively, in some instances, the remote system 104 can receive the message 120 from the first electronic device 102 (and/or one or more of the other electronic devices 118(1)-(N) connected to the conference call). The remote system 104 can then send the first electronic device 102 a message 130 that causes the first electronic device 102 to cease from displaying visual indications (e.g., the first visual indication and the second visual indication) associated with the conference call.

In some instances, the remote system 104 can further cause the first electronic device 102 to provide one or more visual indications that are based on locations of users with respect to electronic devices 118(1)-(N). For instance, the remote system 104 can receive data 122 from the conferencing system 116 and/or an electronic device (e.g., the first electronic device 102 or the second electronic device 118(1)) that represents user speech captured by the second electronic device 118(1). The remote system 104 can then use the location component 134 to analyze the data 122 in order to identify a location of a user providing the user speech with respect to the second electronic device 118(1). For instance, the location component 134 may analyze the data 122 using beamforming, and/or one or more other spatial filtering processing techniques, to identify a direction in which the user is located with respect to the second electronic device 118(1).

For instance, the data 122 may include audio signals captured from individual microphones of the second electronic device 118(1). The location component 134 may analyze the audio signals using beamforming, and/or some other special filtering processing techniques, to determine the direction in which the user is located with respect to the second electronic device 118(1). For instance, the location component 134 can process the audio signals in order to generate one or more directional audio signals, where each directional audio signal represents to a different direction from the second electronic device 118(1). The location component 134 can then can analyze the directional audio signals based on voice detection, energy detection, and far/near-end talk to detection to select a directional audio signal that best represents the direction of the user with respect to the second electronic device 118(1). In some instances, the analyzing comprises selection the direction audio signal that includes the highest energy of each of the directional audio signals.

Based on the direction, the remote system 104 can cause the first electronic device 102 to display a visual indication that indicates the direction to the user 106. For instance, the remote system 104 may determine that the user is located on a north end of the second electronic device 118(1). Additionally, the visual indicator(s) 114 may include a light ring located near a top end of the first electronic device 102. The remote system 104 can thus use the messaging component 112 to send a message 130 to the first electronic device 102 that causes the light ring to display a visual indication using one or more visual indicator(s) 114 that are located on a north end of the light ring. Such techniques are described in detail with regard to FIGS. 8A-8B.

It should be noted that, in some instances, the first electronic device 102 and/or one of the electronic device(s) 118(1)-(N) can perform some and/or all of the functionality described above with regard to the remote system 104. For instance, the first electronic device 102 can receive the message(s) 120 from the conferencing system 116. The first electronic device 102 (and/or similarly an electronic device 118) can then analyze the message(s) 120 and/or the data 122 using one or more of a processing component 110, a messaging component 112, an indication component 128, and a location component 134 in order to display visual indications using the visual indicator(s) 114.

It should further be noted that, in some instances, the remote system 104 and the conferencing system 116 may be combined into a single system, or may be separated into additional systems. Additionally, in some instances, at least one of the remote system 104 or the conferencing system 116 may be local to the first electronic device 102. For instance, the first electronic device 102 may include the functionality described above with regard to the conferencing system 116. Furthermore, and as not illustrated in FIG. 1, one or more of the electronic devices 118(1)-(N) can include similar hardware and functionality as the first electronic device 102. Moreover, in some instances, some and/or all of the functionally described herein can be performed by a third-party service that is separate from the remote system 104 and the conferencing system 116.

Furthermore, it should be noted that the above techniques describe the remote system 104 performing the beamforming and/or other spatial filtering processing techniques. Additionally, or alternatively, in some instances, the beamforming and/or other special filtering processing techniques may be performed by the conferencing system 116, the first electronic device 102, and/or the electronic device 118 that is providing the data 122 being analyzed. In such instances, the remote system 104 can receive a message from the conferencing system 116, the first electronic device 102, and/or the electronic device 118 that indicates the location of the user with respect to the electronic device 118.

As further illustrated in FIG. 1, the first electronic device 102 includes processor(s) 136, network interface(s) 138, microphone(s) 140, speaker(s) 142, and memory 144, which stores at least an operating system 146. The first electronic device 102 (and similarly each of the electronic devices 118(1)-(N)) can belong to a variety of categories or classes of devices such as traditional client-type devices, speech interface devices, desktop computer-type devices, mobile devices, special purpose-type devices, embedded-type devices, Internet of Things (IoT) devices, wearable-type devices, and/or the like.

Additionally, the remote system 104 includes process(s) 148, network interface(s) 150, and memory 152, which stores an operating system 154, the processing component 110, the messaging component 112, the indication component 128, the location component 134, the message(s) 130, and the profile(s) 132. Furthermore, the conferencing system 116 includes processor(s) 156, network interface(s) 158, and memory 160, which stores an operating system 162, the control component 124, the messaging component 126, the message(s) 120, and the data 122. Each of the remote system 102 and the conferencing system 116 may generally refer to a network-accessible platform- or "cloud-based service"— implemented as a computing infrastructure of processors, storage, software, data access, and so forth that is maintained and accessible via the network 164, such as the Internet. As such, each of the remote system 102 and the conferencing system 116 may comprise one or more devices, which collectively may comprise a remote device. Cloud-based services may not require end-user knowledge of the physical location and configuration of the system that delivers the services. Common expressions associated with cloud-based services, such as the remote system 102 and the conferencing system 116, include "on-demand computing", "software as a service (SaaS)", "platform computing", "network accessible platform", and so forth.

As used herein, a processor, such as processor(s) 136, 148, and/or 156, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 136, 148, and/or 156 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 136, 148, and/or 156 may possess its own local memory, which also may store program components, program data, and/or one or more operating systems.

Memory, such as memories 144, 152, and/or 160, may include volatile and nonvolatile memory, removable and non-removable media implemented in any method or technology for storage of information, such as computer-readable instructions, data structures, program component, or other data. Such memory 144, 152, and/or 160 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 144, 152, and/or 160 may be implemented as computer-readable storage media ("CRSM"), which may be any available physical media accessible by the processor(s) 136, 148, and/or 156 to execute instructions stored on the memory 144, 152, and/or 160. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, each respective memory, such as memory 144, 152, and/or 160, discussed herein may include at least one operating system (OS) 146, 154, and/or 162 component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Each of the network interface(s) 138, network interface(s) 150, and network interface(s) 158 may respectively enable communications between the first electronic device 102, the remote system 104, and the conferencing system 116, as well as other networked devices (e.g., network interfaces(s) of electronic devices 118(1)-(N)). Such network interface(s) can include one or more network interface controllers (NICs) or other types of transceiver devices to send and receive communications over a network.

For instance, each of the network interface(s) may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) may include a wide area network (WAN) component to enable communication over a wide area network. The network 164 may represent an array of wired networks, wireless networks, such as WiFi, or combinations thereof.

Figure 2:
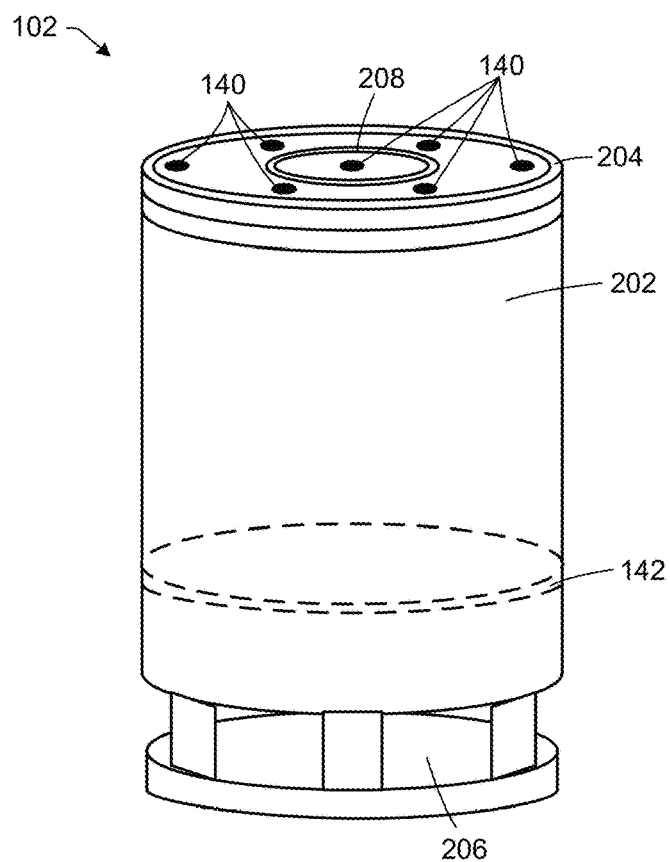
FIG. 2 illustrates an example of an electronic device that a user can utilize during a conference call.
Figure 3:
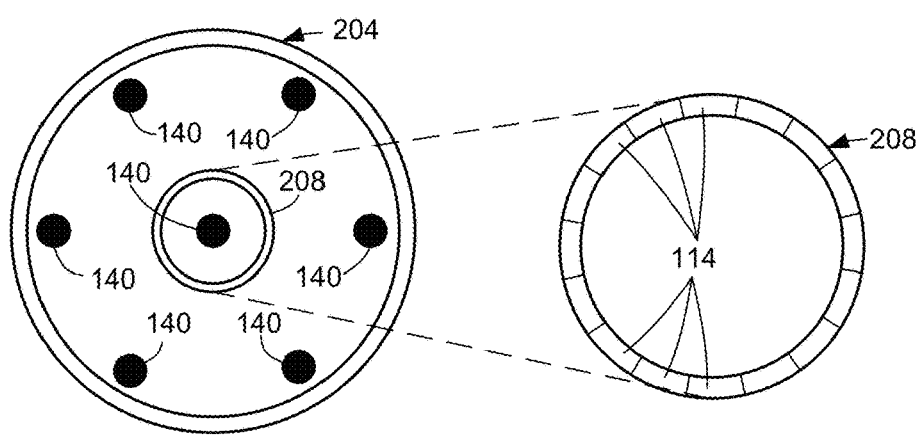
FIG. 3 illustrates an example of a top portion of the electronic device from FIG. 2.

FIGS. 2-3 illustrate features of an example of the electronic device 102. As illustrated in FIG. 2, the electronic device 102 comprises a cylindrical housing 202 having a circular top surface 204. A microphone array is formed by multiple input microphones or microphone elements 140 that are supported by or positioned on the top surface 204. One of the input microphones 140 is positioned at the center of the top surface 204. Other microphones 140 are arranged around the periphery of the top surface 204.

The electronic device 102 may include speaker(s) 142 that are supported or contained by the housing. The speaker(s) 142 may be positioned within and toward the bottom of the housing 202, and may be configured to emit sound omnidirectionally, in a 360 degree pattern around the electronic device 102. For example, the speaker(s) 142 may comprise a round speaker element directed downwardly in the lower part of the housing 202, to radiate sound radially through an omnidirectional opening or gap 206 in the lower part of the housing 202.

The electronic device 102 may have a visual display element 208 on the circular top surface 204 of the housing 202. In the example of FIG. 2, the display element 208 is ring-shaped (circular shaped) and has multiple segments (e.g., portions) that can be individually activated and illuminated in different light colors. As shown, in such an example, the display element 208 can include a given radius with an outer circumference. In other instances, the display element 208 may include any shape that includes any number of segments.

FIG. 3 shows the top surface 204 of the electronic device 102 in more detail. The microphones 140 are positioned at the center and around the periphery of the circular top surface 204. The display element 208 is positioned concentrically in or on the top surface 204. The display element 208 comprises a plurality of visual indicators 114 (e.g., segments). Each visual indicator 114 may comprise a light-emitting diode (LED), a multi-color LED, any other form of solid-state light (SSL), or any other light or lighting element. Each of the visual indicators 114 can be individually illuminated. In addition, each visual indicator 114 may be capable of displaying different light colors, intensities, or temporal patterns. In some instances, the display element 208 may include any number of individual indicators, lights, illuminators, or segments, each of which may comprise an LED (light-emitting diode) or multi-color LED.

Figure 4A:
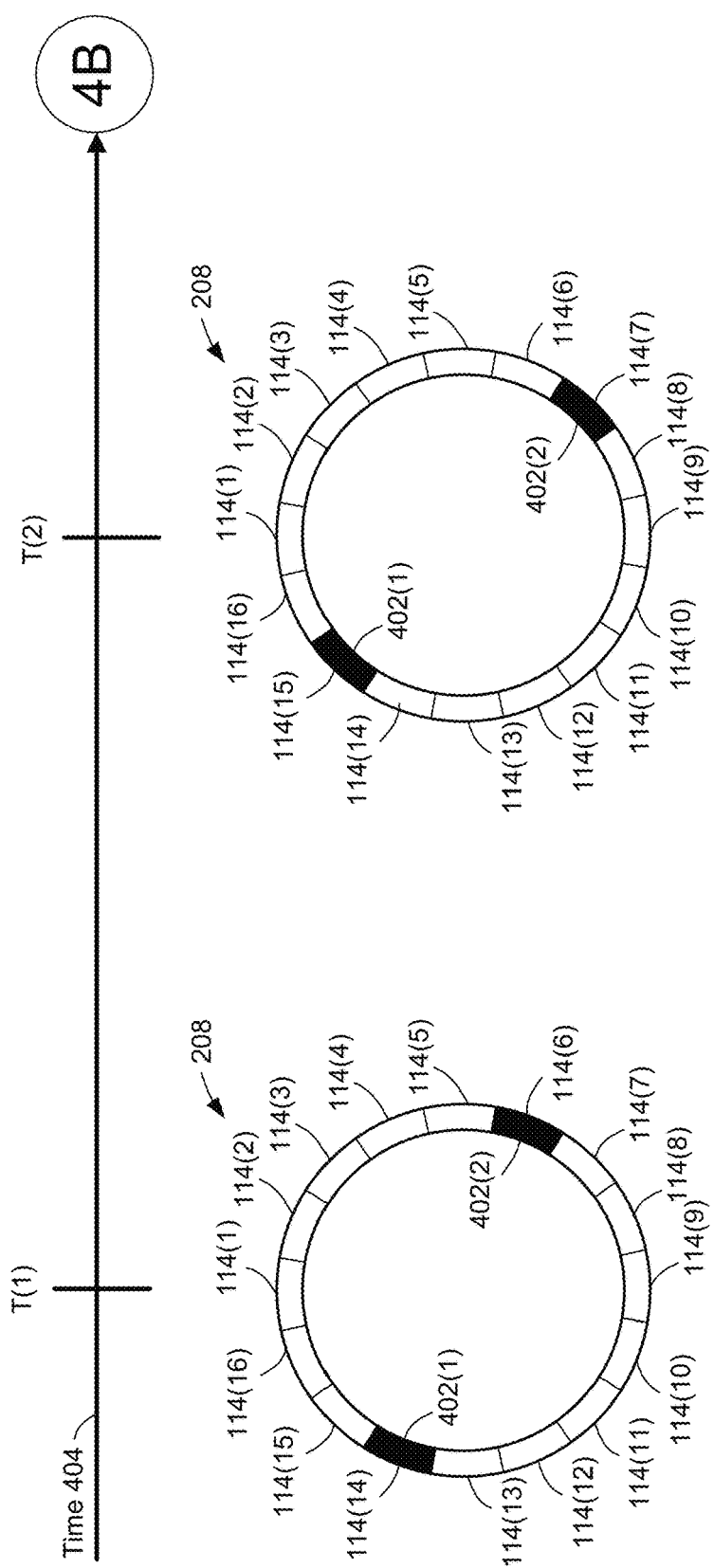
FIGS. 4A-4B illustrate a first example of a visual display element of an electronic device providing visual feedback during a conference call.
Figure 4B:
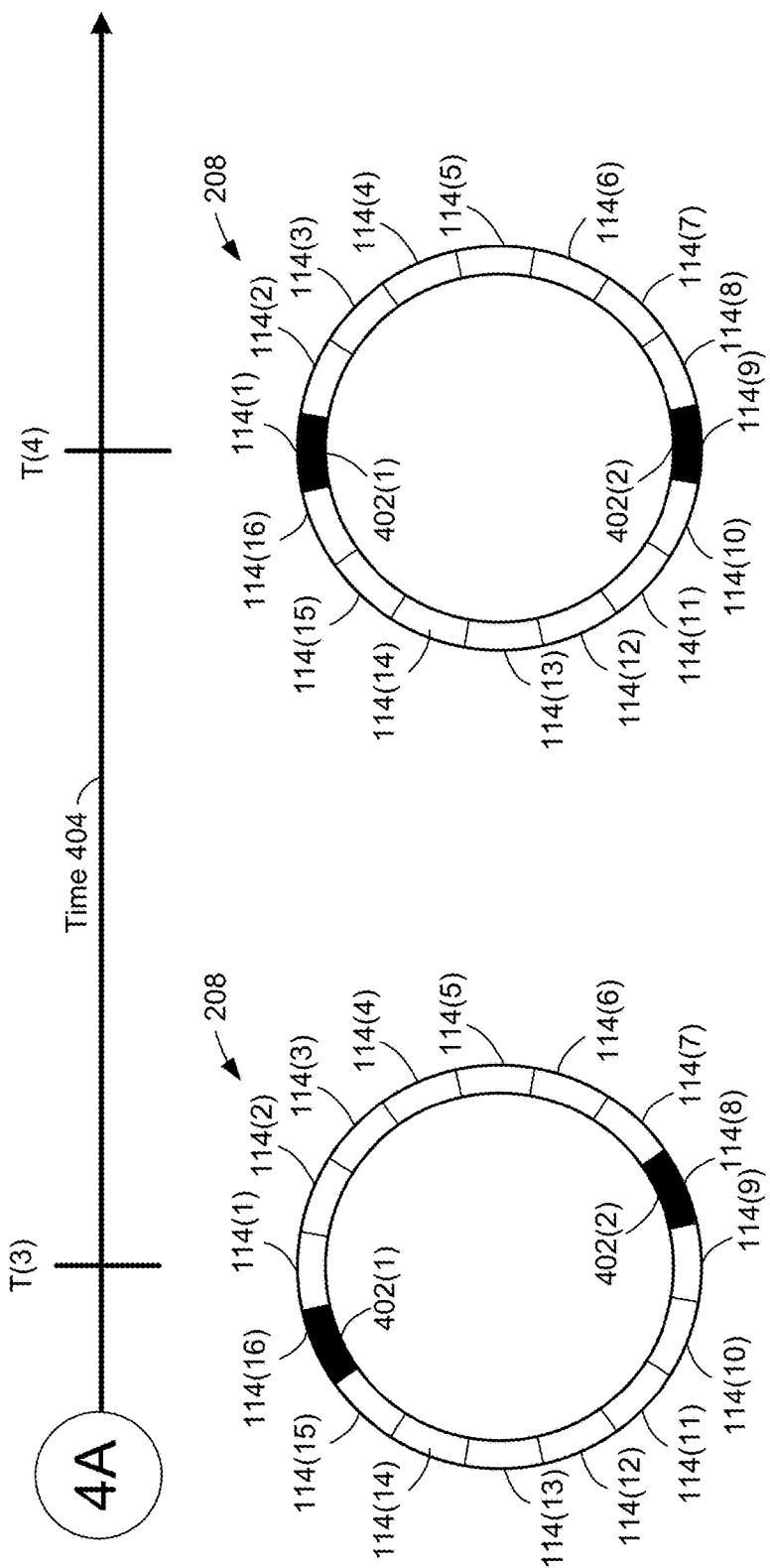

FIGS. 4A-4B illustrate a first example of a visual display element of an electronic device providing visual feedback during a conference call. In the example of FIGS. 4A-4B, a user may be using a first electronic device (e.g., the first electronic device 102) to communicate with at least a first participant (e.g., a second electronic device or first user) and a second participant (e.g., a third electronic device or second user) during a conference call. As such, the first electronic device may receive one or more message(s) from a remote system, such as the remote system 104, that cause the first electronic device to display a first visual indication 402(1) associated with the first participant and a second visual indication 402(2) associated with the second participant. In some instances, the first visual indication 402(1) can include a first light color that is displayed concurrently with the second visual indication 402(2), which can include a second light color. In some instances, the first visual indication 402(1) and the second visual indication 402(2) are equally spaced around the display element 208.

In some instances, during the conference call, the first electronic device can cause the display element 208 to animate the first visual indication 402(1) and the second visual indication 402(2). In some instances, the animation can include causing the first visual indication 402(1) and the second visual indication 402(2) to rotate around the display element 208 in a clockwise and/or counterclockwise motion. For instance, in the example of FIGS. 4A-4B, the first electronic device is causing the first visual indication 402(1) and the second visual indication 402(2) to concurrently rotate around the display element 208 in a clockwise pattern using the various visual indicator 114(1)-(16).

As shown, at time 404 T(1), the fourteenth visual indicator 114(14) is displaying the first visual indication 402(1) and the sixth visual indicator 114(6) is displaying the second visual indication 402(2). Next, at time 404 T(2), the fifteenth visual indicator 114(15) is displaying the first visual indication 402(1) and the seventh visual indicator 114(7) is displaying the second visual indication 402(2). At time 404 T(3), the sixteenth visual indicator 114(16) is displaying the first visual indication 402(1) and the eighth visual indicator 114(8) is displaying the second visual indication 402(2). Finally, at time 404 T(4), the first visual indicator 114(1) is displaying the first visual indication 402(1) and the ninth visual indicator 114(9) is displaying the second visual indication 402(2). As such, the first visual indication 402(1) and the second visual indication 402(2) are concurrently rotating around the display element 208.

It should be noted that, in some instances, the first visual indication 402(1) and the second visual indication 402(2) may not be equally spaced around the display element 208. For instance, the first electronic device may display the first visual indication 402(1) and the second visual indication 402 using visual indicators 114(1)-(16) that are located next to one another, or the first electronic device may display the first visual indication 402(1) and the second visual indication 402 using visual indicators 114(1)-(16) that are located one or more segments apart from one another. Additionally, rather than rotating using a clockwise motion, the first visual indication 402(1) and/or the second visual indication 402(2) may rotate using a counterclockwise rotation.

It should further be noted that, in some instances, the first visual indication 402(1) and/or the second visual indication 402(2) may rotate around the display element 208 using varying speeds. For example, if the first participant is providing audio input, such as speech, then the first visual indication 402(1) may rotate at a faster and/or slower rate of speed than the second visual indication 402(2). For another example, if the first participant is muted, then the first visual indication 402(1) may rotate at a faster and/or slower rate of speed than the second visual indication 402(2).

Figure 5A:
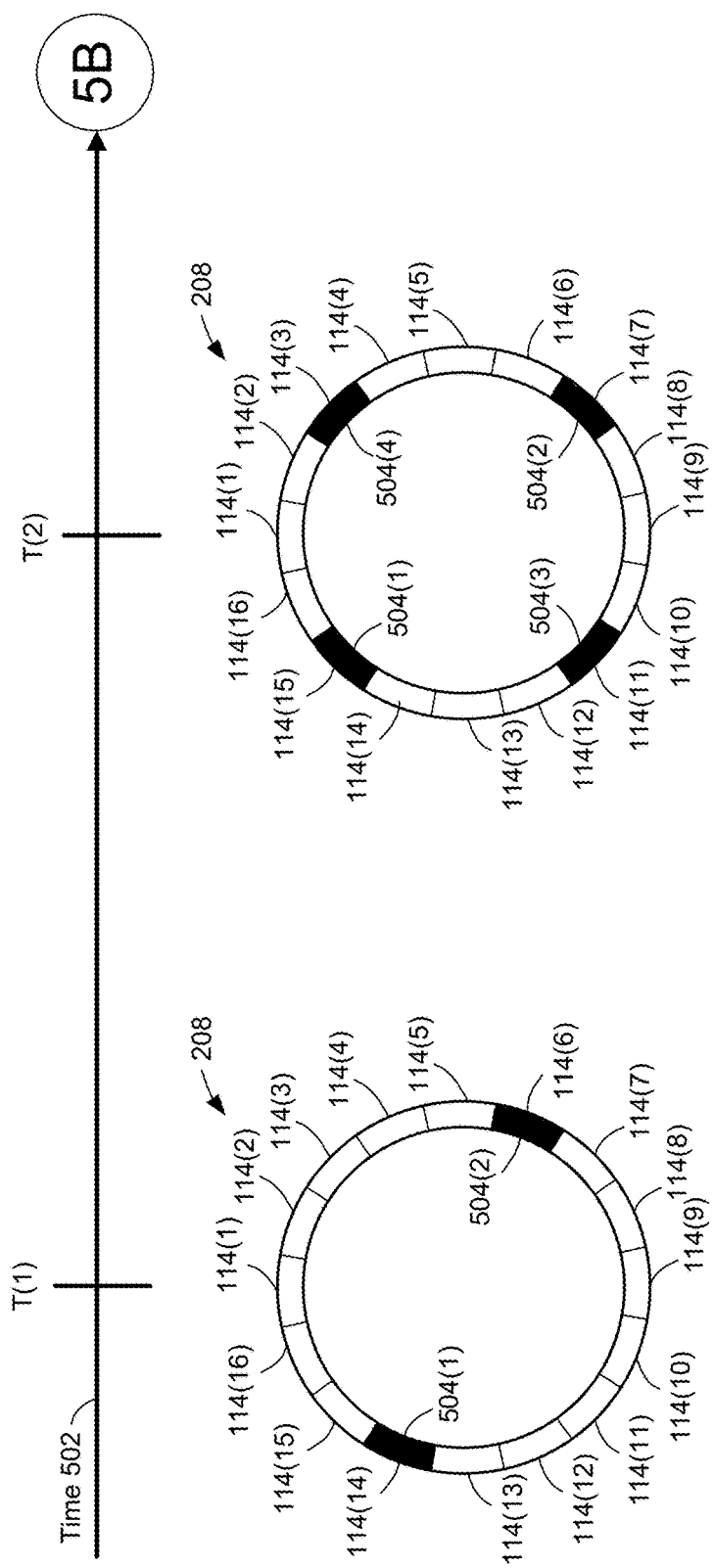
FIGS. 5A-5B illustrate a second example of a visual display element of an electronic device providing visual feedback during a conference call.
Figure 5B:
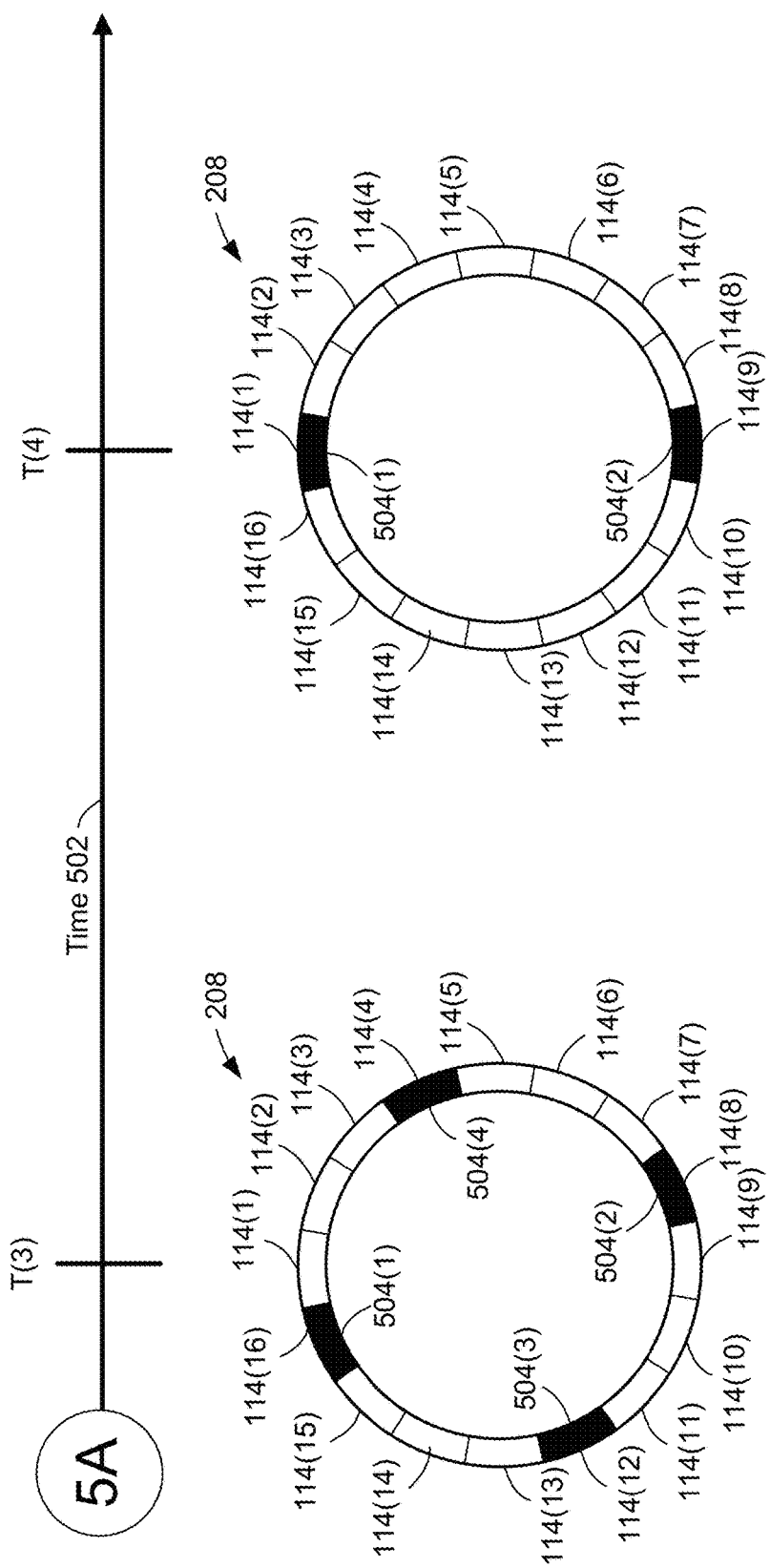

FIGS. 5A-5B illustrate a second example of a visual display element of an electronic device providing visual feedback during a conference call. In the example of FIGS. 5A-5B, at time 502 T(1), a user may be using the first electronic device (e.g., the first electronic device 102) to initially communicate with first participant (e.g., a second electronic device or a first user) and a second participant (e.g., a third electronic device or a second user) during a conference call. As such, the first electronic device may receive one or more message(s) from a remote system, such as the remote system 104, that cause the first electronic device to display a first visual indication 504(1) associated with the first participant and a second visual indication 504(2) associated with the second participant. In some instances, the first visual indication 504(1) can include a first light color that is displayed concurrently with the second visual indication 504(2), which can include a second light color. In some instances, the first visual indication 504(1) and the second visual indication 504(2) are equally spaced around the display element 208.

In some instances, during the conference call, the first electronic device may receive one or more messages that indicate that participants have connected to the conference call. For instance, in the example of FIGS. 5A-5B, at time 502 T(2), the first electronic device can receive one or more messages from the remote system that causes the first electronic device to display a third visual indication 504(3) associated with a third participant (e.g., a fourth electronic device or a third user) and a fourth visual indication 504(4) associated with a fourth participant (e.g., a fifth electronic device or a fourth user). In some instances, the third visual indication 504(3) can include a third light color and the fourth visual indication 504(4) can include a fourth light color that are both displayed concurrently with the first visual indication 504(1) and the second visual indication 504(2). In some instances, the visual indications 504(1)-(4) are equally spaced around the display element 208.

In some instances, during the conference call, the first electronic device may receive one or more messages that indicate that one or more participants have disconnected from the conference call. For instance, in the example of FIGS. 5A-5B, at time 502 T(4), the first electronic device can receive one or more messages from the remote system that causes the first electronic device to cease from displaying the third visual indication 504(3) and the fourth visual indication 504(4). In some instances, the first electronic device can receive the one or more messages based on the third participant and the fourth participant disconnecting from the conference call.

Additionally, in some instances, the first electronic device may continue to animate the visual indications 504(1)-(4) using similar techniques as shown in FIGS. 4A-4B. For instance, at time 502 T(1), the fourteenth visual indicator 114(14) is displaying the first visual indication 504(1) and the sixth visual indicator 114(6) is displaying the second visual indication 504(2). Next, at time 502 T(2), the fifteenth visual indicator 114(15) is displaying the first visual indication 504(1), the seventh visual indicator 114(7) is displaying the second visual indication 504(2), the eleventh visual indicator 114(11) is displaying the third visual indication 504(3), and the third visual indicator 114(3) is displaying the fourth visual indication 504(4). Additionally, at time 502 T(3), the sixteenth visual indicator 114(16) is displaying the first visual indication 504(1), the eighth visual indicator 114(8) is displaying the second visual indication 504(2), the twelfth visual indicator 114(12) is displaying the third visual indication 504(3), and the fourth visual indicator 114(4) is displaying the fourth visual indication 504(4). Finally, at time 502 T(4), the first visual indicator 114(1) is displaying the first visual indication 504(1) and the ninth visual indicator 114(9) is displaying the second visual indication 504(2).

It should be noted that, in some instances, the first electronic device may not animate the visual indications 504(1)-(4) during the conference call. For instance, the first electronic device may continue to display the first visual indication 504(1) using the fourteenth visual indicator 114(14) and display the second visual indication 504(2) using the sixth visual indicator 114(6) during the course of the conference call while the first participant and the second participant are respectively connected to the conference call with the first electronic device. Additionally, based on the third participant and the fourth participant connecting to the conference call, the first electronic device can respectively display the third visual indication 504(3) and the fourth visual indication 504(4) using a respective one of the visual indicator 114(1)-(16) while the fourth electronic device and the fifth electronic device remain connected to the conference call.

It should further be noted that, in some instances, the first electronic device may display the third visual indication 504(3) and the fourth visual indication 504(4) for reasons other than participants connecting/disconnecting from the conference call. For example, the first electronic device may display one of the third visual indication 504(3) or the fourth visual indication 504(4) based on the first electronic device communicating with a third-party system, such as the remote system 104, during the conference call. For another example, the first electronic device may display one of the third visual indication 504(3) or the fourth visual indication 504(4) based on receiving a message (e.g., an audio message) from an electronic device that is not connected to the conference call.

Furthermore, it should be noted that, in some instances, two or more users may be using a single electronic device to participate in the conference call. For instance, the third visual indication 504(3) and the fourth visual indication 504(4) may be associated with two different users that are using a single electronic device. In such instances, the third visual indication 504(3) and the fourth visual indication 504(4) can include the same visual indication and/or can include different visual indications. Additionally, the third visual indication 504(3) and the fourth visual indication 504(4) may change during the conference call based on which of the users is speaking (changing visual indications is described below with regard to FIGS. 6A-6B). Furthermore, in some instances, when the two users are using the single electronic device, the visual indications of the respective users may be displayed next to each other on the display element 208. For instance, if the third visual indication 504(3) and the fourth visual indication 504(4) correspond to two users using a single electronic device, then the third visual indication 504(3) and the fourth visual indication 504(4) may be displayed next to one another (e.g., using the first visual indicator 114(1) and the second visual indicator 114(2)).

Figure 6A:
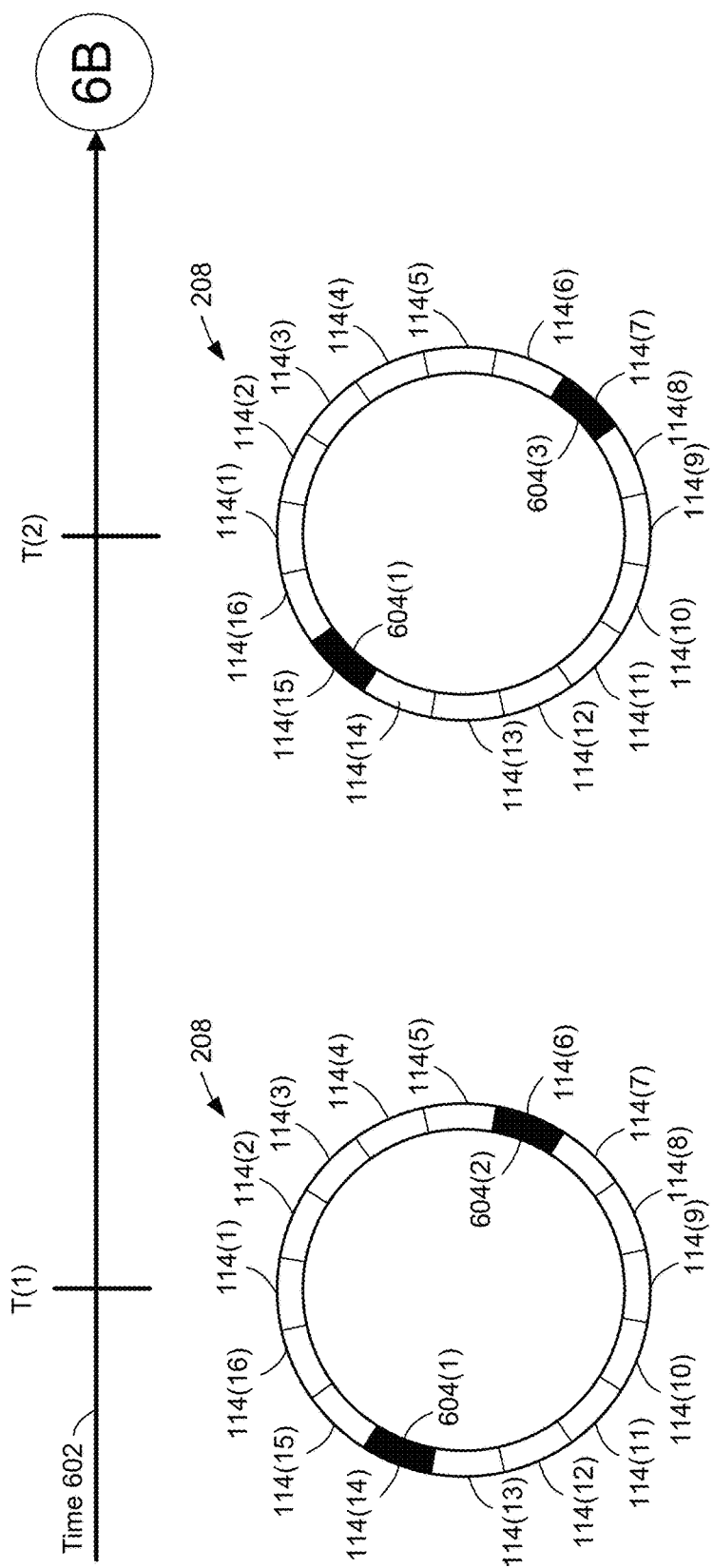
FIGS. 6A-6B illustrate a third example of a visual display element of an electronic device providing visual feedback during a conference call.
Figure 6B:
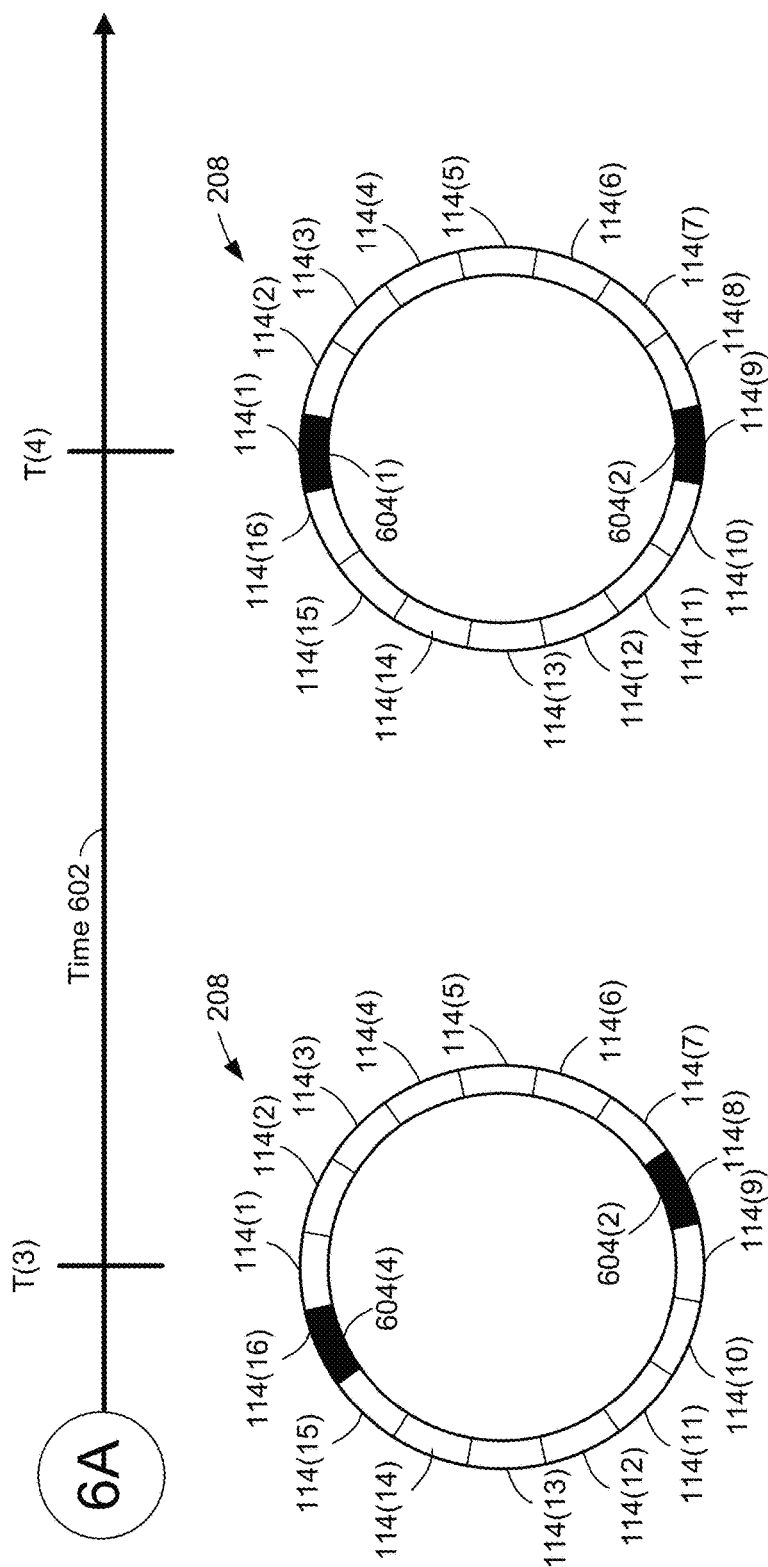

FIGS. 6A-6B illustrate a third example of a visual display element of an electronic device providing visual feedback during a conference call. In the example of FIGS. 6A-6B, a user may again be using a first electronic device (e.g., the first electronic device 102) to communicate with at least a first participant (e.g., a second electronic device or a first user) and a second participant (e.g., a third electronic device or a second user) during a conference call. As such, at time 602 T(1), the first electronic device may receive one or more message(s) from a remote system, such as the remote system 104, that cause the first electronic device to display a first visual indication 604(1) associated with the first participant and a second visual indication 604(2) associated with the second participant. In some instances, the first visual indication 604(1) can include a first light color that is displayed concurrently with the second visual indication 604(2), which can include a second light color. In some instances, the first visual indication 604(1) and the second visual indication 604(2) are equally spaced around the display element 208.

During the conference call, the remote system may determine that the first participant and/or the second participant is providing audio and, in response, cause the first electronic device to display an indication indicating that the user is speaking. For instance, the first electronic device can determine that the first user or the second user is speaking during the conference call and as such, a respective electronic device associated with the first user or the second user is providing audio data representing user speech. In some instances, the remote system receives a message indicating that the respective user is speaking during the conference call, such as from a conferencing system. Additionally, or alternatively, in some instances, the remote system and/or the first electronic device can receive data being sent between the electronic devices and analyze the data to determine which speaker is speaking. For instance, the remote system and/or the first electronic device can analyze the data to identify user speech represented by the data. The remote system and/or the first electronic device can then determine which electronic device sent the data that represents the user speech.

For instance, in the example of FIGS. 6A-6B, at time 602 T(2), the remote system can determine that the first participant (e.g., the first user) is using a respective electronic device to provide data representing during the conference call. In response, the remote system can send a message to the first electronic device that causes the first electronic device to display a third visual indication 604(3) associated with the first participant. In some instances, the third visual indication 604(3) can include a different light color, light sequence, and/or light pattern than the second visual indication 604(2). In some instances, the third visual indication 604(3) can be associated with participants that are providing user speech during conference calls.

Additionally, at time 602 T(3), the remote system can determine that the second participant (e.g., the second user) is using a respective electronic device to provide data representing speech during the conference call. In response, the remote system can send a message to the first electronic device that causes the first electronic device to display a fourth visual indication 604(4) associated with the second participant. The message can further cause the first electronic device to once again display the second visual indication 604(2) associated with the first participant since the first participant is no longer speaking. In some instances, the fourth visual indication 604(4) can include a different light color, light sequence, and/or light pattern that the first visual indication 604(1). In some instances, the fourth visual indication 604(4) can include the same visual indication as the third visual indication 604(3).

At time 602 T(4), the remote system can once again determine that neither the first participant nor the second participant is providing audio representing speech the conference call. In response, the remote system can send the first electronic device a message that causes the first electronic device to once again display a first visual indication 604(1) associated with the second electronic device and a second visual indication 604(2) associated with the second electronic devices.

It should be noted that, in some instances, the first electronic device may display the third visual indication 604(3) and/or the fourth visual indication 604(4) for reasons other than a participant providing audio representing speech. For example, the first electronic device may provide the third visual indication 604(3) based on the first participant being muted during the conference call.

It should further be noted that, in some instances, both the first participant and the second participant may be utilizing a single additional electronic device to communicate with the first electronic device during the conference. In such instances, the first electronic device, the remote system, the conferencing system, and/or the additional electronic device can determine which participant is currently providing speech input, such as by using speech recognition and/or voice recognition (described above). The first electronic device can then provide the third visual indication 604(3) and/or the fourth visual indication 604(4) based on the determination (using the techniques described above).

Figure 7A:
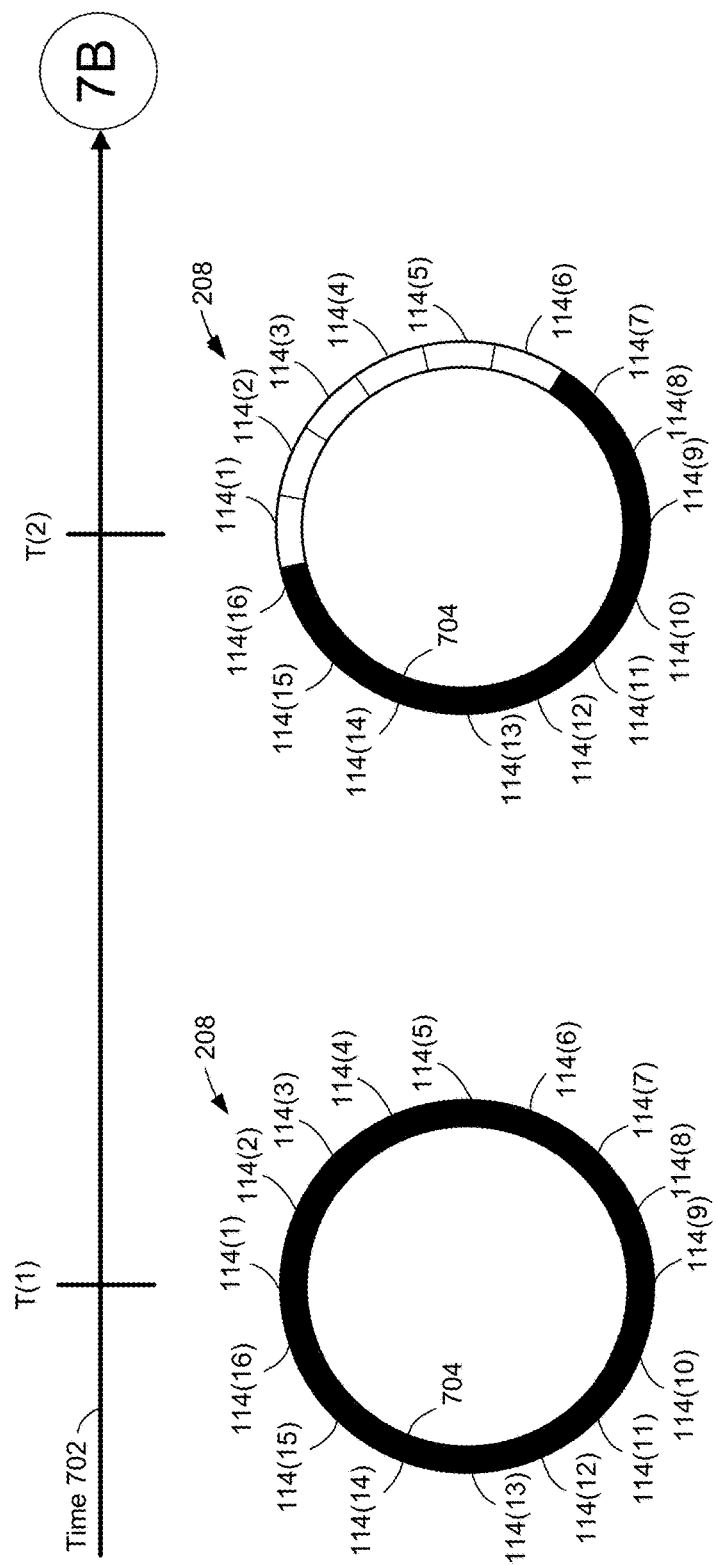
FIGS. 7A-7B illustrate an example of a visual display element of an electronic device providing visual feedback with respect to a timer during a call.
Figure 7B:
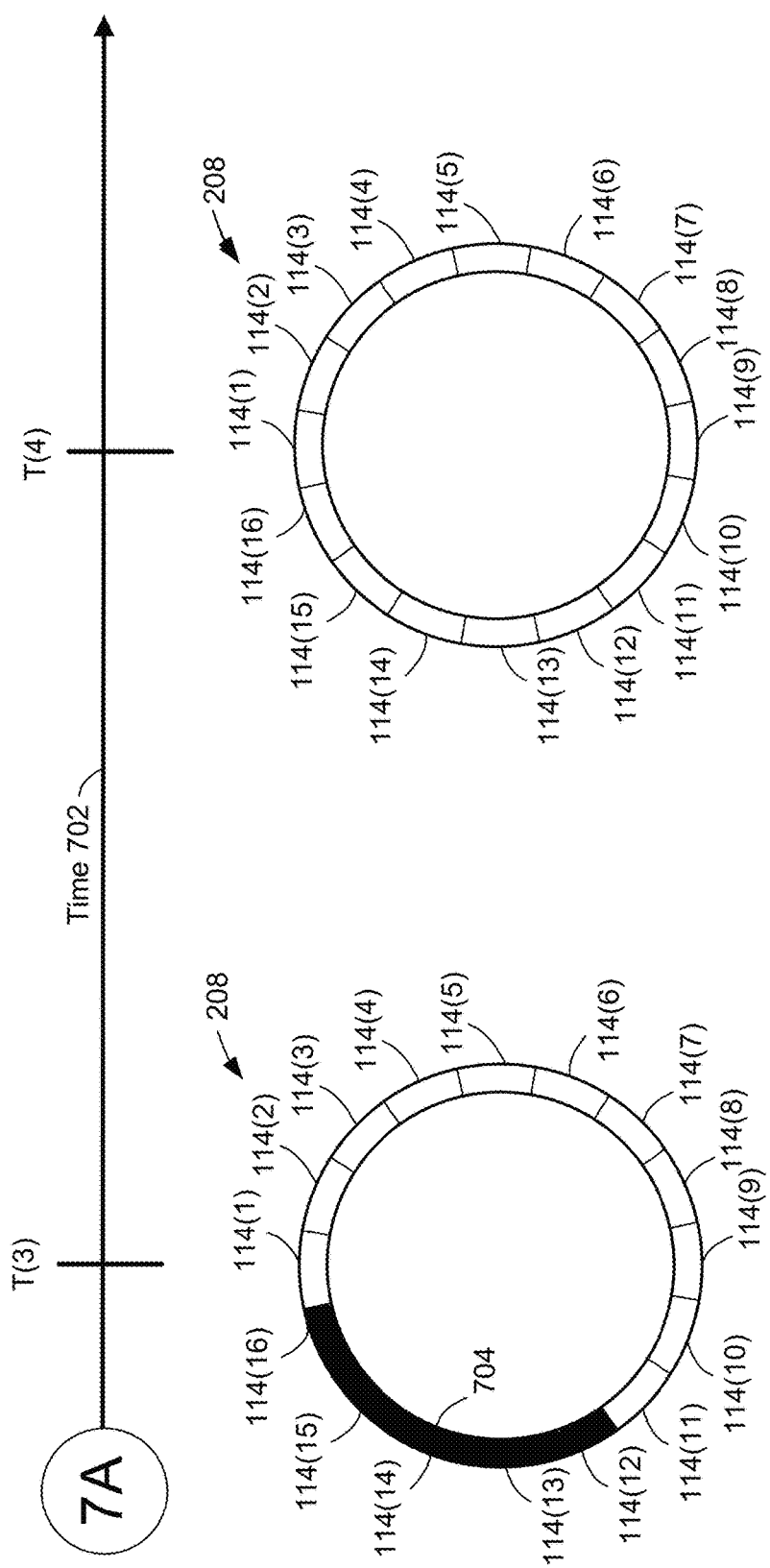

FIGS. 7A-7B illustrate an example of a visual display element of an electronic device providing visual feedback with respect to a timer during a call. For instance, the first electronic device may be participating in a call with a participant, such as a second electronic device. In some instances, the call may include a time limit, such as one hour, that a user of the first electronic device and the first participant agree on before the call.

As such, before the call, the user may provide input to the first electronic device that indicates the time limit, such as through speech. Based on the input, and when the first electronic device connects to the second electronic device, at time 702 T(1), the first electronic device may receive a message that causes the first electronic device to provide a visual indication 704. As shown, the visual indication 704 includes all of the visual indicators 114(1)-(16) emitting light. For instance, the entire light ring of the first electronic device may be emitting light at the beginning of the call to indicate that the timer is beginning.

Later, at time 702 T(2) during the call, the visual indication 704 may only include a first portion of the light indicators 114(7)-(16) emitting light. In some instances, the first portion of the light indicators 114(7)-16) still emitting light may correspond to the portion of the time limit that is remaining. For instance, if the time limit includes one hour, and if time 702 T(2) corresponds to twenty minutes into the call, then about two-thirds of the display element 208 may continue to emit light to indicate that one-third of the time limit has passed during the call.

As shown in FIG. 7B, later, at time 702 T(3) during the call, the visual indication 704 may only include a second portion of the light indicators 114(12)-(16) emitting light. In some instances, the second portion of the light indicators 114(7)-16) still emitting light may correspond to the portion of the time limit that is remaining for the call. For instance, if the time limit includes one hour, and if time 702 T(3) corresponds to forty minutes into the call, then about one-third of the display element 208 may continue to emit light to indicate that two-thirds of the time limit has passed during the call.

Additionally, as further shown in FIG. 7B, at time 702 T(4), the entire time limit for the call may have passed (e.g., one hour in the example above). As such, none of the visual indicators 114(1)-(16) are emitting light to indicate that the time limit is complete. In some instances, based on the timer finishing, the first electronic device may automatically disconnect from the call. Additionally, or alternatively, in some instances, based on the timer finishing, the first electronic device may output sound indicating that the timer is complete.

Figure 8A:
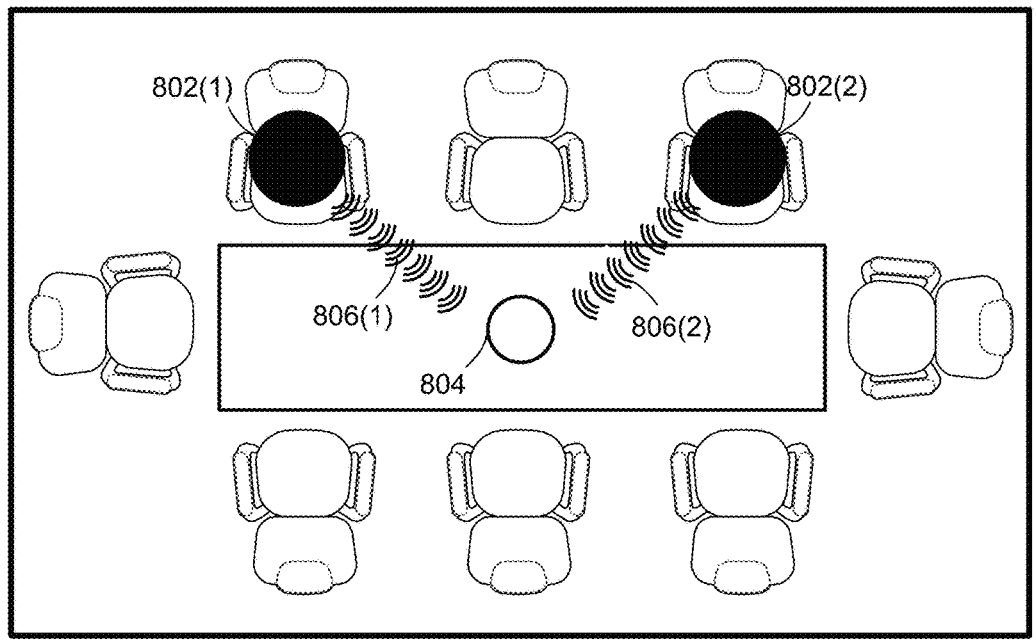
FIGS. 8A-8B illustrate an example of a visual display element of a first electronic device providing feedback during a call with at least a second electronic device.
Figure 8A:
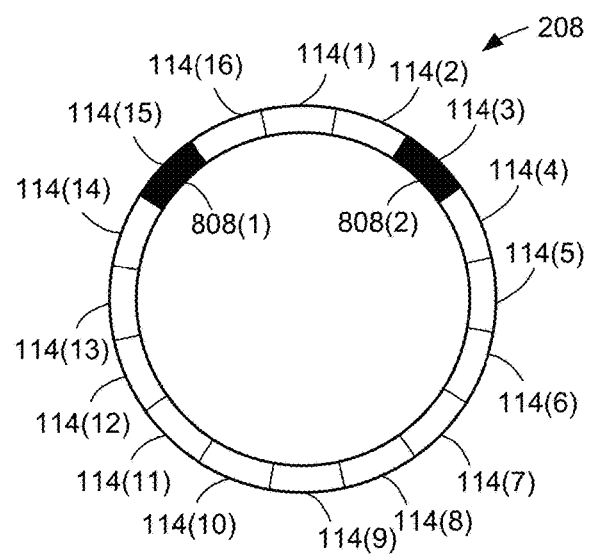
Figure 8B:
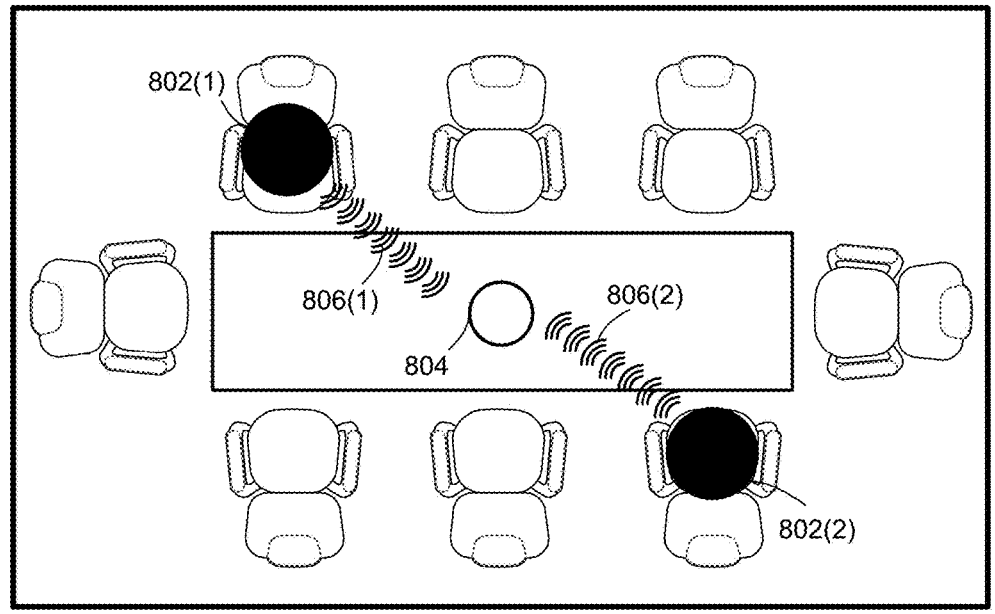
Figure 8B:
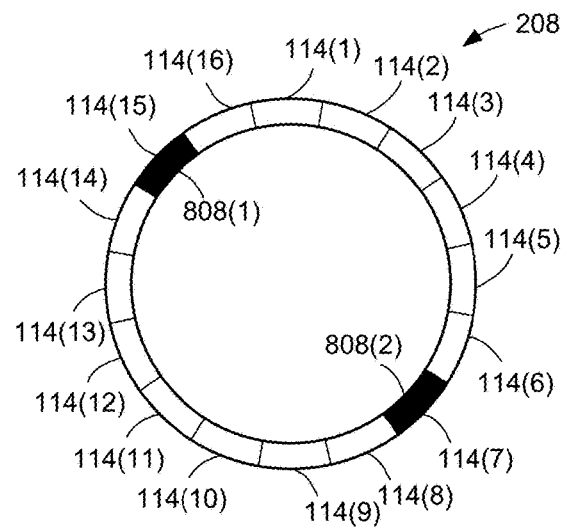

FIGS. 8A-8B illustrate an example of a visual display element of a first electronic device providing feedback during a call with at least a second electronic device. In the example of FIGS. 8A-8B, a first user 802(1) and a second user 801(2) are using an electronic device 804, which may represent one of electronic devices 118(1)-(N), to communicate with a user of the electronic device 102 (only the display element 208 of the electronic device 102 is illustrated in the example). For instance, the electronic device 804 is capturing first user speech 806(1) from the first user 802(1) and second user speech 806(2) from the second user 802(2).

The first electronic device (and/or similarly the electronic device 804) can determine that two users 802(1)-(2) are utilizing the electronic device 804. In some instances, the first electronic device makes the determination by analyzing audio (e.g., using one or more algorithms associated voice recognition and/or speaker identification) received from the electronic device 804, where the data (e.g., respective first and second portions of the data) represents the first user speech 806(1) and the second user speech 806(2). Based on the analysis, the electronic device 804 can identify that the audio represents the user speech 806(1)-(2) from each of the two different users 802(1)-(2). Additionally, or alternatively, in some instances, the first electronic device makes the determination by receiving a message indicating that the two users 802(1)-(2) are utilizing the electronic device 804. For instance, the first electronic device can receive the message from the electronic device 804, a remote system, and/or a conferencing system.

The first electronic device can further display a first visual indication 808(1) associated with the first user 802(1) and a second visual indication 808(2) associated with the second user 802(2). In some instances, the first electronic device receives one or more messages from a remote system that causes the first electronic device to display the first visual indication 808(1) and the second visual indication 808(2). Additionally, or alternatively, in some instances, the first electronic device associates the first user 802(1) with the first visual indication 808(1) and the second user 802(1) with the second visual indication 808(2) based on determining that the two users 802(1)-(2) are using the electronic device 804. The electronic device 102 then displays the first visual indication 808(1) and the second visual indication 808(2) using the display element 208.

In some instances, and as illustrated in the example of FIGS. 8A-8B, the first electronic device displays the first visual indication 808(1) and the second visual indication 808(2) based on respective locations of the first user 802(1) and the second user 802(2). For instance, the first electronic device can determine a first location of the first 802(1) with respect to the electronic device 804 and a second location of a second user 802(2) with respect to the electronic device 804. In some instances, the first electronic device can determine the locations by analyzing the data using beamforming, or one or more other spatial filtering processing techniques, to determine a first direction of the first 802(1) and a second direction of the second user 806(2) with respect to the electronic device 804. Additionally, or alternatively, in some instances, the first electronic device can determine the directions based on receiving, from the remote system or the electronic device 804, a message indicating the respective directions of the user 802(1)-(2) (which may perform a similar analysis as the first electronic device).

The first electronic device can then display the first visual indication 808(1) and the second visual indication 808(2) based on the locations. For instance, as illustrated in the example of FIG. 8A, the first direction associated with the first user 802(1) may indicate that the first user 802(1) is located northwest of the electronic device 804 and, and the second direction associated with the second user 802(2) may indicate that the second user 802(2) is located northeast of the electronic device 804. Based on locations, the first electronic device can cause the fifteenth visual indicator 114(15), which is located on the northwest side of the display element 208, to display the first visual indication 808(1) associated with the first user 802(1). Additionally, the first electronic device can cause the third visual indicator 114(3), which is located on the northeast side of the display element 208, to display the second visual indication 808(2) associated with the second user 802(2).

In some instances, the first electronic device can continue to determine the locations of the users 802(1)-(2) with respect to the electronic device 804 and update the display of the respective visual indication 808(1)-(2) in response. For instance, as illustrated in the example of FIG. 8B, the second user 802(2) has moved from the northeast direction from the electronic device 804 to a southeast direction from the electronic device 804. In response, the first electronic device causes the third visual indicator 114(3) to cease from displaying the second visual indication 808(2). Additionally, the first electronic device causes the seventh visual indicator 114(7), which is located on the southeast side of the display element 208, to display the second visual indication 808(2) associated with the second user 802(2).

Figure 9A:
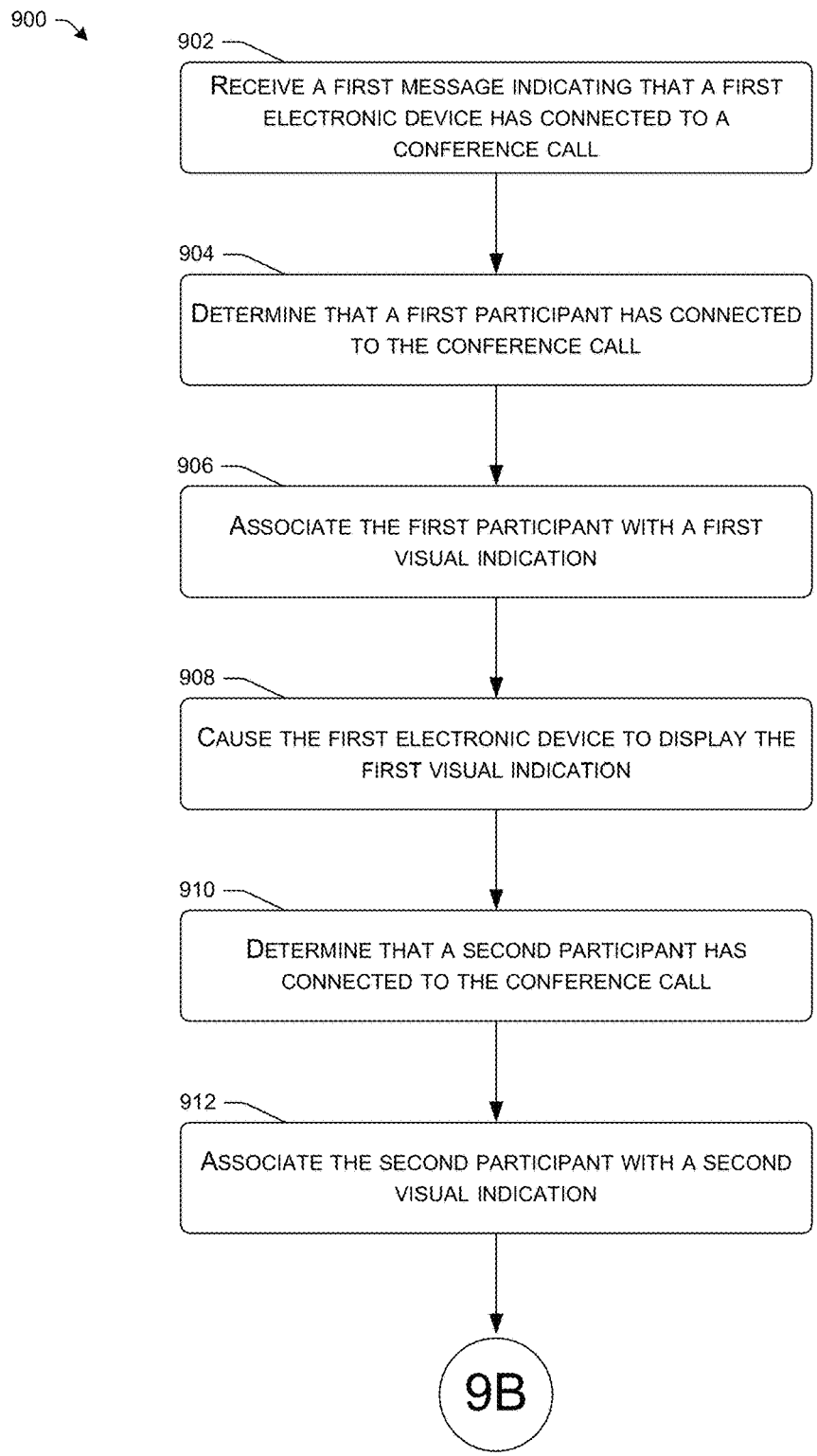
FIGS. 9A-9B illustrate a flow diagram of an example process for providing lighting indications in speech-based systems.
Figure 9B:
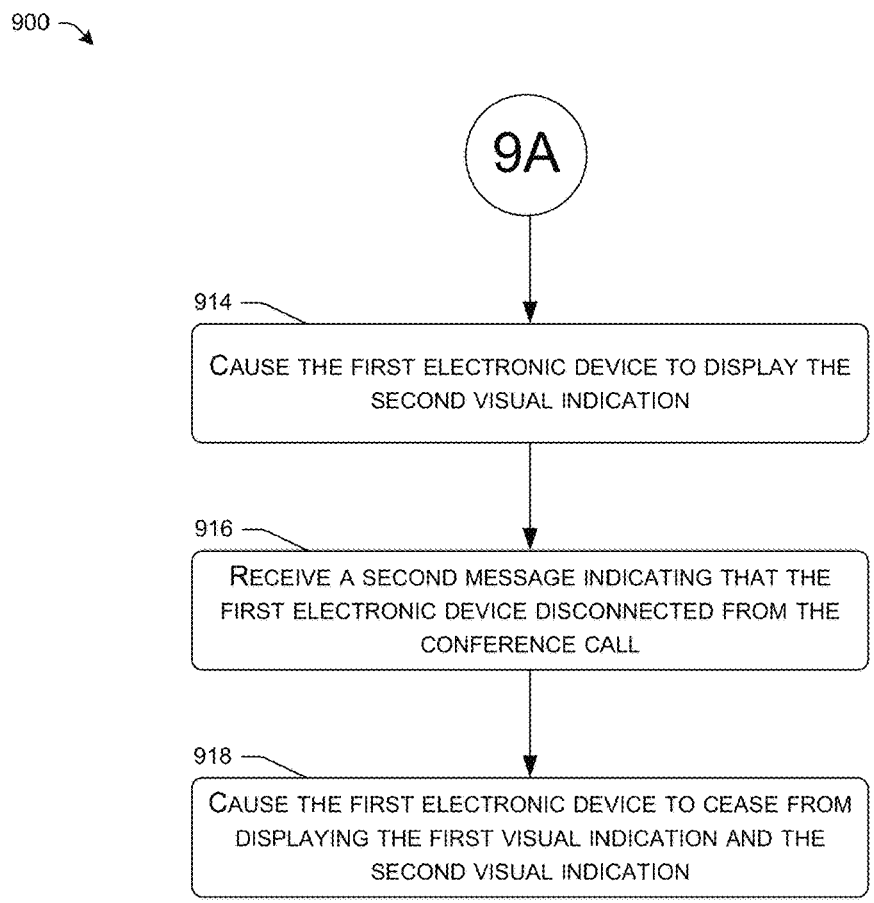

FIGS. 9A-9B illustrate a flow diagram of an example process 900 for providing lighting indications in speech-based systems. The process 900, as well as each process described herein, is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Additionally, any number of the described blocks can be optional and eliminated to implement the processes. The processes may be performed, in some instances, by the remote system 104, the first electronic device 102, the conferencing system 116, other electronic devices, or any combination thereof.

At 902, the process 900 receives a first message indicating that a first electronic device has connected to a conference call. For instance, the remote system 104 can receive, from at least one of a conferencing system or the first electronic device, a message indicating that the first electronic device has connected to a conference call. In some instances, the first message may indicate that the first electronic device is currently the only electronic device connected to the conference call. In other instances, the first message may indicate that one or more participants (e.g., other electronic devices) are already connected to the conference call.

At 904, the process 900 determines that a first participant has connected to the conference call. For instance, the remote system 104 may receive, from at least one of the conferencing system or the first electronic device, the message indicating that a second electronic device and/or a first user using the second electronic device has connected to the conference call with the first electronic device. In some instances, the remote system 104 receives the message in response to the second electronic device connecting to the conference call.

At 906, the process 900 associates the first participant with a first visual indication. For instance, based on receiving the second message, the remote system 104 can associate the first participant with the first visual indication. The first visual indication can include a first light color, a first light sequence, and/or a first light pattern. In some instances, the remote system 104 analyzes a profile associated with the first electronic device and/or a user associated with the first electronic device to identify the first visual indication to associate with the first participant.

At 908, the process 900 causes the first electronic device to display the first visual indication. For instance, the remote system 104 can communicate with the first electronic device to cause the first electronic device to display the first visual indication. In some instances, communicating with the first electronic device can include sending, to the first electronic device, a message instructing the first electronic device to display the first visual indication. In response to receiving the message, the first electronic device can activate one or more visual indicators to provide the first visual indication.

In some instances, the first electronic device includes a light ring with a circular shape. The light ring can include a given radius, such as one inch, two inches, three inches, or the like. To cause the first electronic device to display the first visual indication, the remote system 104 can communicate with the first electronic device to cause the first electronic device to display the first visual indication using a first portion of a circumference of the light ring. For instance, the first electronic device can emit light using the first portion of the circumference of the light ring.

At 910, the process 900 determines that a second participant has connected to the conference call. For instance, the remote system 104 may receive, from at least one of the conferencing system or the first electronic device, the message indicating that a third electronic device, a second user using the second electronic device, and/or a second user using the third electronic device has connected to the conference call with the first electronic device. In some instances, the remote system 104 receives the message in response to the second electronic device connecting to the conference call.

At 912, the process 900 associates the second participant with a second visual indication. For instance, based on receiving the third message, the remote system 104 can associate the second participant with the second visual indication. The second visual indication can include a second light color, a second light sequence, and/or a second light pattern. In some instances, the remote system 104 analyzes the profile associated with the first electronic device and/or the user associated with the first electronic device to identify the second visual indication to associate with the third electronic device.

At 914, the process 900 causes the first electronic device to display the second visual indication. For instance, the remote system 104 can communicate with the first electronic device to cause the first electronic device to display the second visual indication. In some instances, communicating with the first electronic device an include sending, to the first electronic device, a message instructing the first electronic device to display the second visual indication. In response to receiving the message, the first electronic device can activate one or more visual indicators to provide the second visual indication.

As discussed above, in some instances, the first electronic device includes a light ring with a circular shape. To cause the first electronic device to display the first visual indication, the remote system 104 can communicate with the first electronic device to cause the first electronic device to display the second visual indication using a second portion of a circumference of the light ring. For instance, the first electronic device can emit light using the second portion of the circumference of the light ring. In some instances, the first portion of the light ring provides the first visual indication concurrently with the second portion of the light ring providing the second visual indication.

In some instances, the first electronic device can rotate the first visual indication and the second visual indication around the light ring. For instance, the first electronic device can use different portions of the circumference of the light ring to emit light such that the first visual indication rotates around the light ring. Additionally, the first electronic device can use different portions of the circumference of the light ring to emit light such that the second visual indication rotates around the light ring.

At 916, the process 900 receives a second message indicating that the first electronic device disconnected from the conference call. For instance, the remote system 104 can receive, from at least one of the conferencing system or the first electronic device, the second message indicating that the first electronic device disconnected from the conference call. In some instances, the remote system 104 receives the second message in response to the first electronic device disconnecting.

At 918, the process 900 causes the first electronic device to cease from displaying the first visual indication and the second visual indication. For instance, the remote system 104 can communicate with the first electronic device to cause the first electronic device to cease from displaying the first visual indication and the second visual indication. In some instances, communicating with the first electronic device can include sending the first electronic device a message instructing the first electronic device to cease from displaying the first visual indication and the second visual indication. In response to receiving the message, the first electronic device can cause the one or more visual indicators to cease from providing the first visual indication and the second visual indication.

It should be noted that, while the above describes the remote system 104 as performing the process 900 of FIG. 9, in some instances, one or more other electronic devices may perform some and/or all of process 900 of FIG. 9. For instance, the first electronic device, the conferencing system, and/or some other third-party system may perform some and/or all of the process 900 of FIG. 9.

Figure 10:
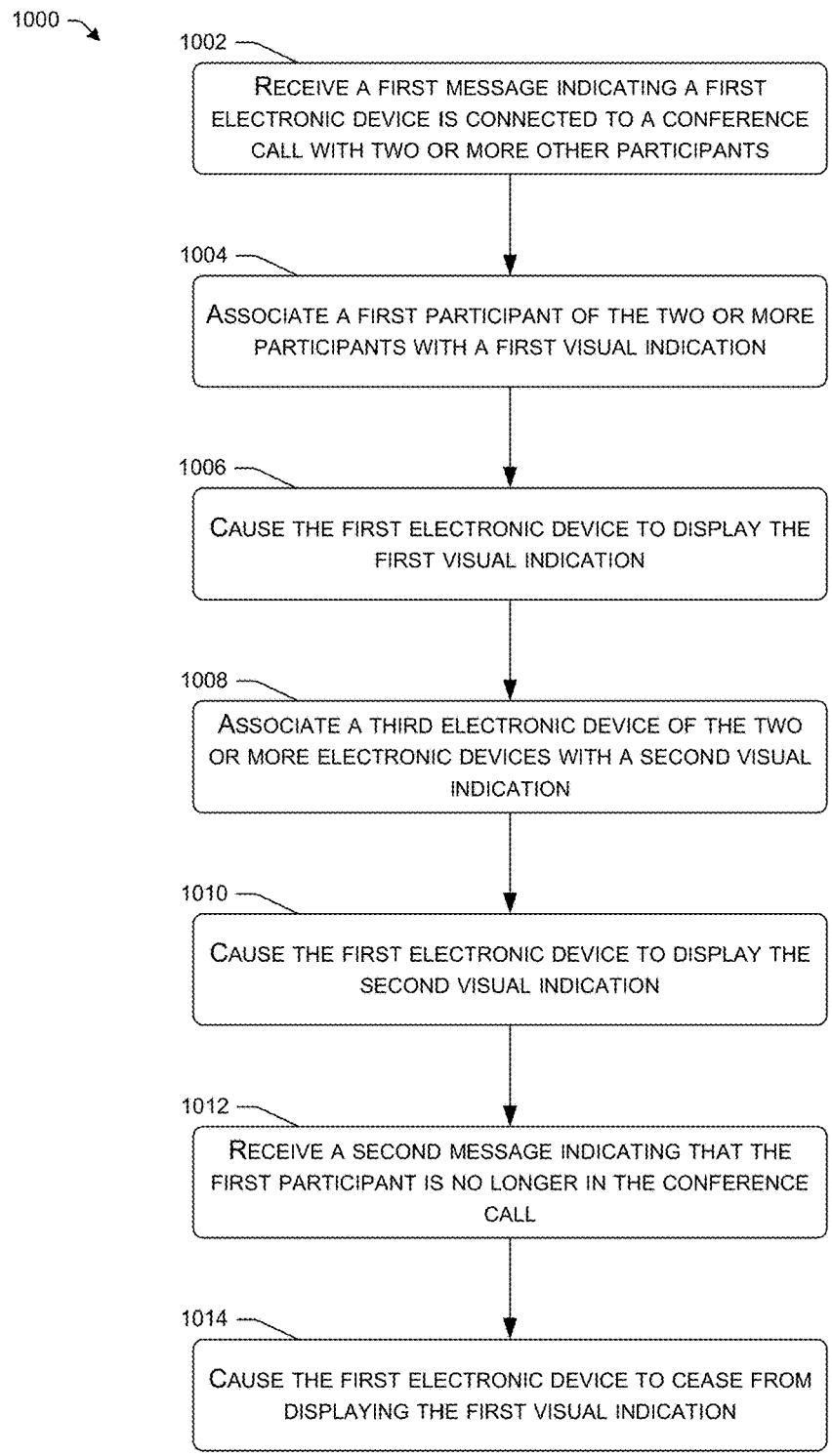
FIG. 10 illustrates a flow diagram of an example process for causing an electronic device to provide lighting indications during a conference call.

FIG. 10 illustrates a flow diagram of an example process 1000 for providing lighting indications during a conference call. At 1002, the process 1000 receives a first message indicating that a first electronic device is connected to a conference call with two or more other participants. For instance, a remote system may receive the first message indicating that a first electronic device is sending and receiving synchronous audio communications with two or more participants of a conference call. In some instances, the remote system 104 may receive the first message from at least one of the electronic devices or a conferencing system. In some instances, the first message may further identify each participant connected to the conference call. In some instances, each participant can include either another user or another electronic device.

At 1004, the process 1000 associates a first participant of the two or more participants with a first visual indication. For instance, based on receiving the first message, the remote system 104 can associate the first participant with the first visual indication. The first visual indication can include a first light color, a first light sequence, and/or a first light pattern. In some instances, the remote system 104 analyzes a profile associated with the first electronic device and/or a user associated with the first electronic device to identify the first visual indication to associate with the first participant.

At 1006, the process 1000 causes the first electronic device to display the first visual indication. For instance, the remote system 104 can communicate with the first electronic device to cause the first electronic device to display the first visual indication. In some instances, communicating with the first electronic device an include sending, to the first electronic device, a message instructing the first electronic device to display the first visual indication. In response to receiving the message, the first electronic device can activate one or more visual indicators to provide the first visual indication.

At 1008, the process 1000 associates a second participant of the two or more participants with a second visual indication. For instance, based on receiving the first message, the remote system 104 can associate the second participant with the second visual indication. The second visual indication can include a second light color, a second light sequence, and/or a second light pattern. In some instances, the remote system 104 analyzes the profile associated with the first electronic device and/or the user associated with the first electronic device to identify the second visual indication to associate with the second participant.

At 1010, the process 1000 causes the first electronic device to display the second visual indication. For instance, the remote system 104 can communicate with the first electronic device to cause the first electronic device to display the second visual indication concurrently with the first visual indication. In some instances, communicating with the first electronic device an include sending, to the first electronic device, a message instructing the first electronic device to display the second visual indication. In response to receiving the message, the first electronic device can activate one or more visual indicators to provide the second visual indication.

At 1012, the process 1000 receives a second message indicating that the first participant is no longer in the conference call. For instance, the remote system 104 can receive, from at least one of the electronic devices or the conferencing system, the second message. In some instances, the remote system 104 receives the second message in response to the second electronic device disconnected from the conference call. In some instances, the remote system 104 receives the message in response to the first user no longer being located within an environment of the electronic device that the first user was using to participate in the conference call.

At 1014 the process 1000 causes the first electronic device to cease from displaying the first visual indication. For instance, the remote system 104 can communicate with the first electronic device to cause the first electronic device to cease from displaying the first visual indication associated with the first participant. In some instances, communicating with the first electronic device can include sending the first electronic device a message instructing the first electronic device to cease from displaying the first visual indication. In response to receiving the message, the first electronic device can cause the one or more visual indicators to cease from providing the first visual indication.

Figure 11A:
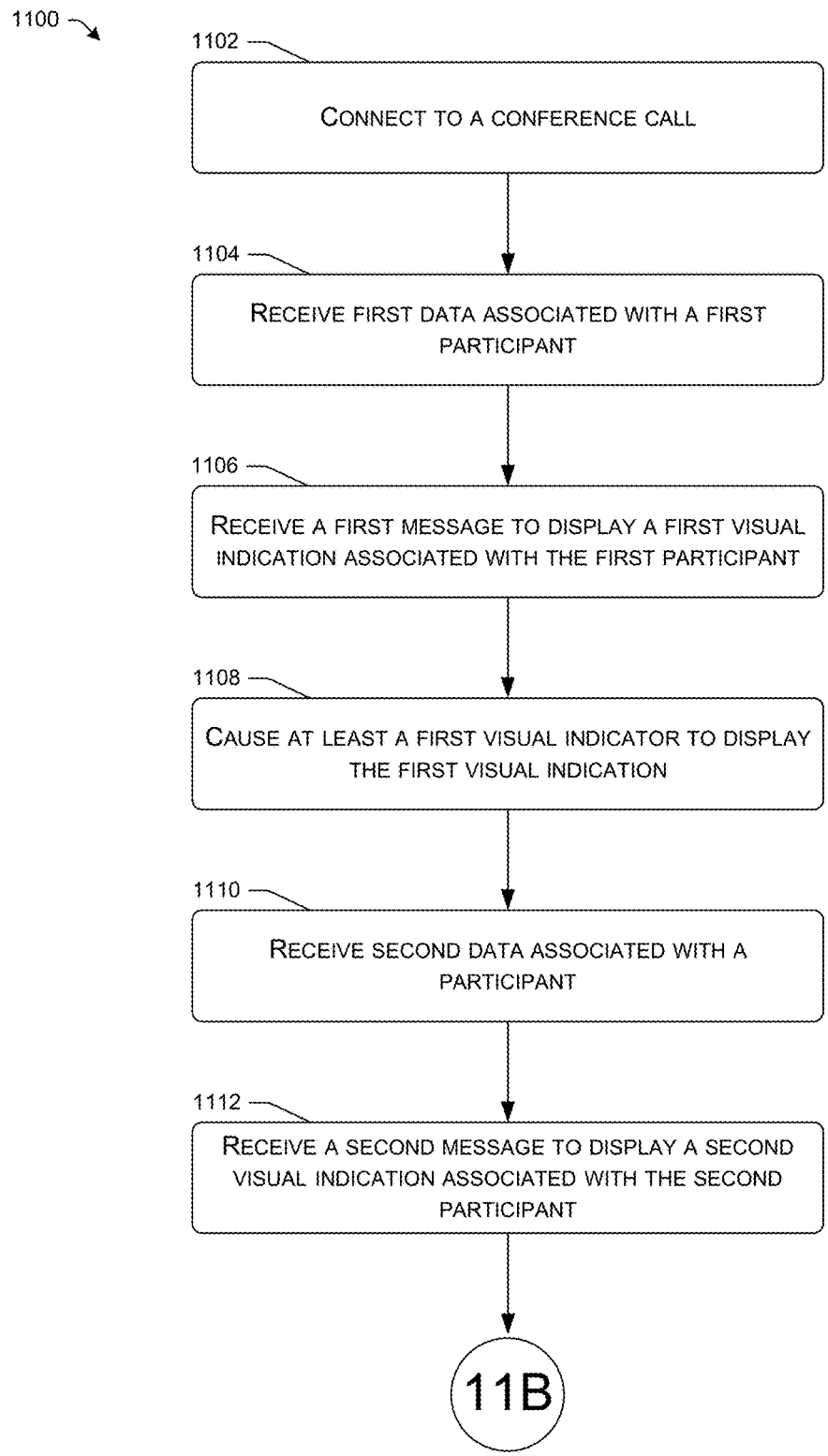
FIGS. 11A-11B illustrate a flow diagram of an example process for displaying lighting indications while connected to a conference call.
Figure 11B:
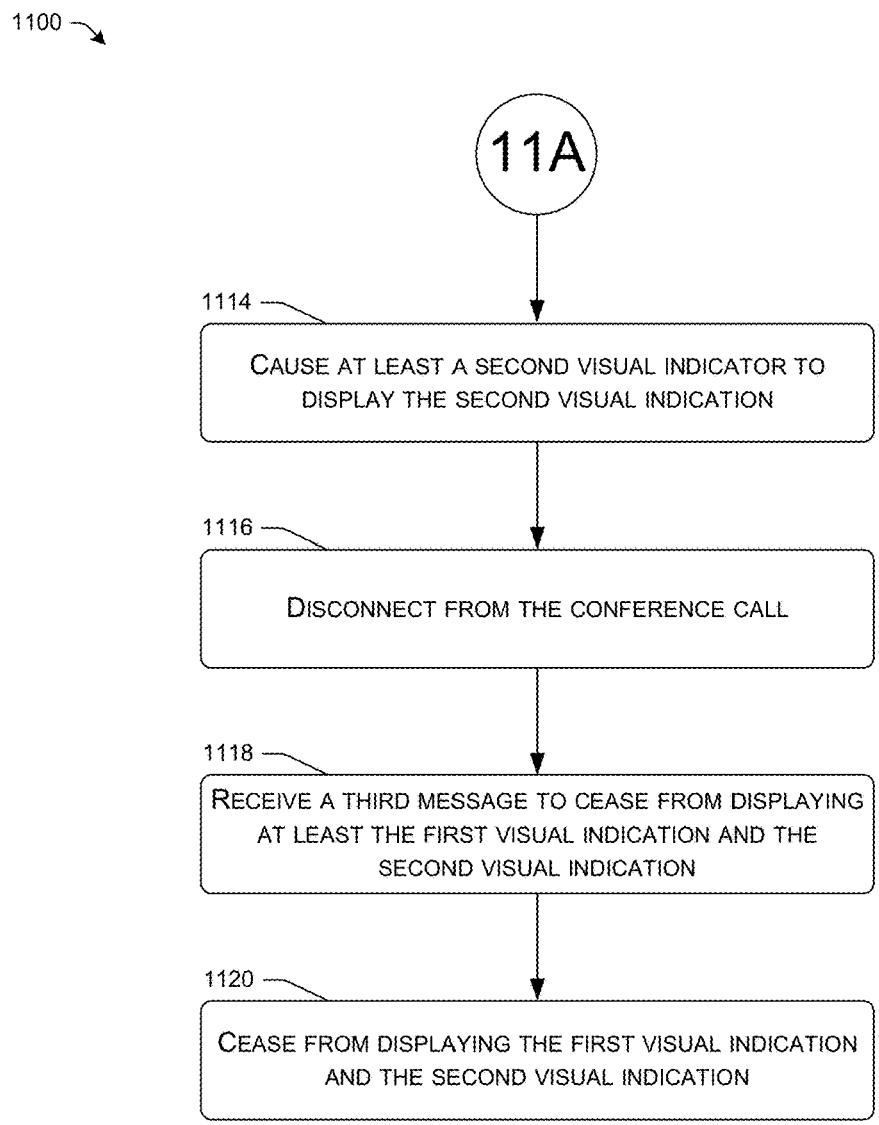

FIGS. 11A-11B illustrate a flow diagram of an example process 1100 for displaying lighting indications while connected to a conference call. At 1102, the process 1100 connects to a conference call. For instance, an electronic device 102 can receive input (e.g., a phone number) from a user to connect to a conferencing system that is organizing the conference call. In some instances, the electronic device 102 receives the input via user speech captured by at least one microphone of the electronic device. In such instances, the electronic device 102 can then send audio data representing the user speech to a remote system for analysis. In response, the electronic device 102 can receive a message from the remote system that causes the electronic device 102 to connect to the conference call via the conferencing system.

At 1104, the process 1100 receives first data associated with a first participant. For instance, the electronic device 102 can receive, from at least one of a first electronic device or the conferencing system, first data that represents at least user speech from a first user. In some instances, the first electronic device captures the user speech from the first user and generates the first data in response. The electronic device 102 can then output audible sound using the at least one speaker. The audible sound can represent at least the user speech from the user.

At 1106, the process 1100 receives a first message to display a first visual indication associated with a first participant. For instance, the electronic device 102 can receive, from the remote system, the first message that instructs the electronic device 102 to display the first visual indication associated with the first participant. In some instances, the electronic device 102 receives the first message based on the remote system determining that the first participant is participating in the conference call with the electronic device 102. In such instances, the remote system can make the determination based on receiving a message from the electronic device 102 or the conferencing system.

At 1108, the process 1100 causes at least a first visual indicator to display the first visual indication. For instance, based on receiving the first message, the electronic device 102 can display the first visual indication by activating at least the first visual indicator disposed on the electronic device 102. If the visual indicator includes a light ring, displaying the first visual indication can include causing a first portion of the light ring to emit light associated with the first visual indication. The first visual indication can include a first light color, a first light sequence, and/or a first light pattern.

At 1110, the process 1100 receives second data associated with a second participant. For instance, the electronic device 102 can receive, from at least one of the first electronic device, a second electronic device, or the conferencing system, second data that represents at least user speech from a second user. In some instances, the first electronic device and/or the second electronic device captures the user speech from the second user and generates the second data in response. The electronic device 102 can then output audible sound using the at least one speaker. The audible sound can represent at least the user speech from the user.

At 1112, the process 1100 receives a second message to display a second visual indication associated with the second participant. For instance, the electronic device 102 can receive, from the remote system, the second message that instructs the electronic device 102 to display the second visual indication associated with the second participant. In some instances, the electronic device 102 receives the second message based on the remote system determining that the second participant is participating in the conference call with the electronic device 102. In such instances, the remote system can make the determination based on receiving a message from the electronic device 102 or the conferencing system.

At 1114, the process 1100 causes at least a second visual indicator to display the second visual indication. For instance, based on receiving the second message, the electronic device 102 can display the second visual indication by activating at least the second visual indicator disposed on the electronic device 102. If the visual indicator includes a light ring, displaying the second visual indication can include causing a second portion of the light ring to emit light associated with the second visual indication. The second visual indication can include a second light color, a second light sequence, and/or a second light pattern.

At 1116, the process 1100 disconnects from the conference call. For instance, the electronic device 102 can disconnect from the conference call with the first electronic device and the second electronic device. In some instances, the electronic device 102 disconnects in response to receiving input from a user to disconnect from the conference call. For instance, the electronic device 102 may receive, using the at least one microphone, user speech from the user that causes the electronic device 102 to disconnect from the conference call.

At 1118, the process 1100 receives a third message to cease from displaying at least the first visual indication and the second visual indication. For instance, the electronic device 102 may receive, from the remote system, the third message that instructs the electronic device 102 to cease from displaying visual indications associated with the conference call. In some instances, the electronic device 102 receives the third message based on the remote system determining that the electronic device 102 disconnected from the conference call. In such instances, the remote system can make the determination based on receiving a message (e.g., audio data representing the user speech) from the electronic device 102 or the conferencing system.

At 1120, the process 1100 ceases from displaying the first visual indication and the second visual indication. For instance, based on receiving the third message, the electronic device 102 can cause the visual indicators to cease from displaying visual indications associated with the conference call.

It should be noted that, in some instances, the electronic device 102 may not receive the messages to display the visual indications. Rather, in some instances, the electronic device 102 may cause the first visual indicator to display the first visual indication based on receiving the first data and cause the second visual indicator to display the second visual indication based on receiving the second data. Additionally, the electronic device 102 may not receive the third message to cease from displaying the visual indications. Rather, the electronic device 102 may cease from displaying the visual indications based on disconnecting from the conference call.

Figure 12A:
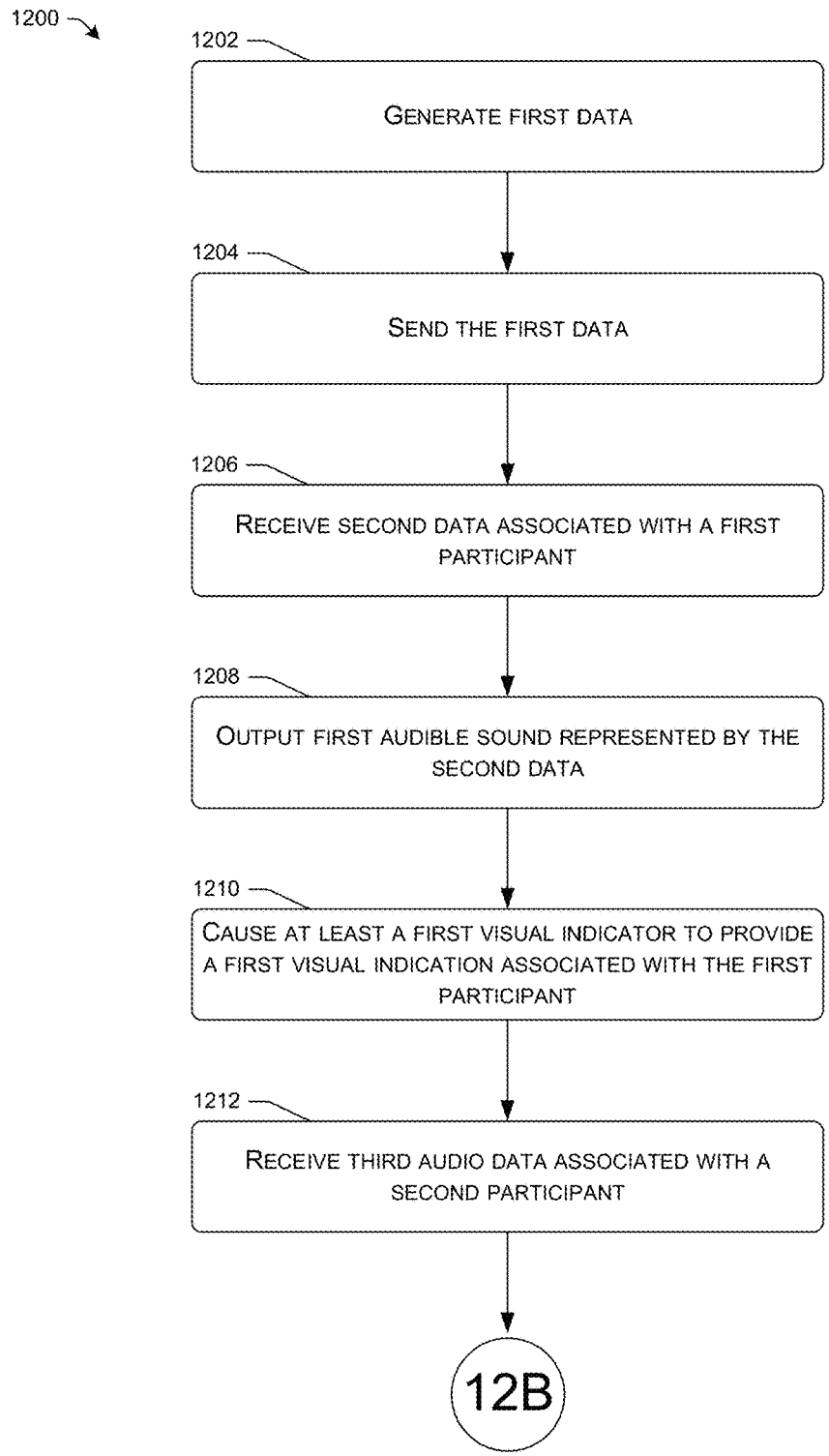
FIGS. 12A-12B illustrate a flow diagram of an example process for displaying lighting indications during a conference call with two or more participants.
Figure 12B:
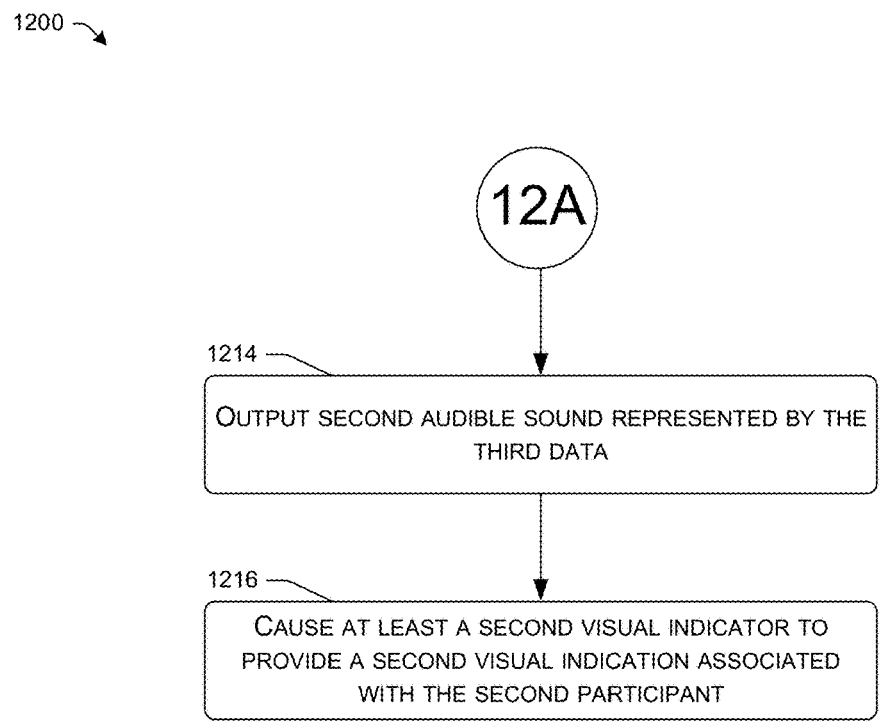

FIGS. 12A-12B illustrate a flow diagram of an example process 1200 for displaying lighting indications during a conference call with two or more participants. At 1202, the process 1200 generates first data and at 1204, the process 1200 sends the first data. For instance, during a conference call, an electronic device 102 can capture user speech from a first user using at least one microphone. The electronic device 102 can then generate data, such as audio data, representing the user speech. Additionally, the electronic device 102 can send the data to at least one other electronic device or to a conferencing system organizing the conference call.

At 1206, the process 1200 receives second data associated with a first participant and at 1208, the process 1200 outputs first audible sound represented by the second data. For instance, the electronic device 102 can receive, from at least one of a first electronic device or the conferencing system, the second data that represents user speech from a second user. The electronic device 102 can then output the first audible sound using at least one speaker. The first audible sound can represent at least the user speech from the second user.

At 1210, the process 1200 causes at least a first visual indicator to provide a first visual indication associated with the first participant. For instance, the electronic device 102 can associate with the first participant with the first visual indication. In some instances, the electronic device 102 makes the association based on receiving a message from a remote system. In some instances, the electronic device 102 makes the association based on receiving the second data from the first electronic device. The electronic device 102 can then cause the at least a first visual indicator to provide the first visual indication to the first user.

At 1212, the process 1200 receives third data associated with a second participant and at 1214, the process 1200 outputs second audible sound represented by the third data. For instance, the electronic device 102 can receive, from at least one of the first electronic device, a second electronic device, or the conferencing system, the third data that represents user speech from a third user. The electronic device 102 can then output the second audible sound using the at least one speaker. The second audible sound can represent at least the user speech from the third user.

At 1216, the process 1200 causes at least a second visual indicator to provide a second visual indication associated with the second participant. For instance, the electronic device 102 can associate with the second participant with the second visual indication. In some instances, the electronic device 102 makes the association based on receiving a message from a remote system. In some instances, the electronic device 102 makes the association based on receiving the third data from the second electronic device. The electronic device 102 can then cause the at least second visual indicator to provide the second visual indication to the first user.

Figure 13:
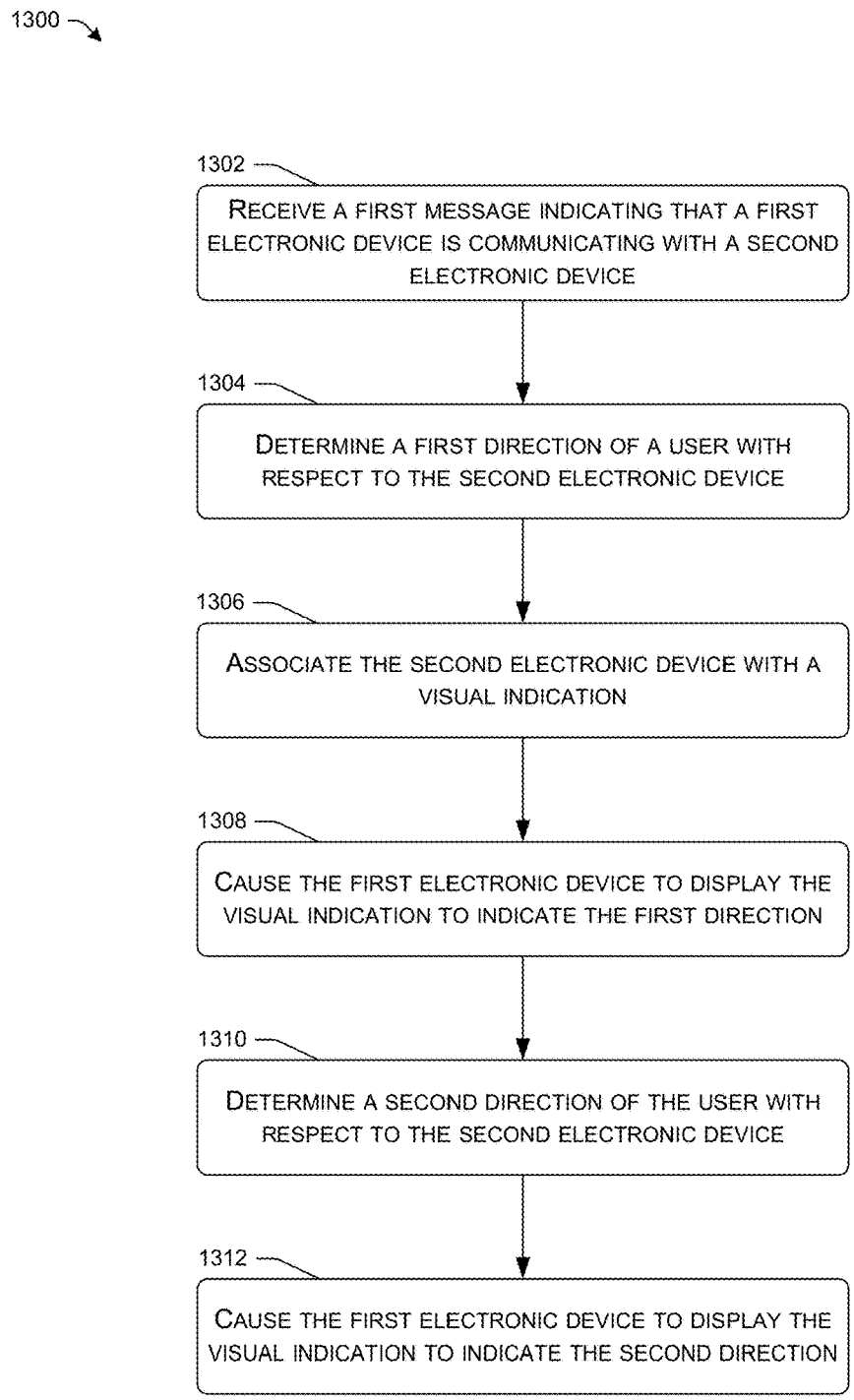
FIG. 13 illustrates a flow diagram of an example process for providing lighting indications that are based on locations of users.

FIG. 13 illustrates a flow diagram of an example process 1300 for providing lighting indications that are based on locations of users. At 1302, the process 1300 receives a first message indicating that a first electronic device is communicating with a second electronic device. For instance, a remote system 104 can receive, from at least one of the first electronic device or a conferencing system, the message indicating that the first electronic device is communicating with the second electronic device. In some instances, the electronic devices are connected to a conference call with one or more other electronic devices. In other instances, the electronic devices are directly communicating with one another.

At 1304, the process 1300 determines a first direction of a user with respect to the second electronic device. In some instances, the remote system 104 can receive data representing user speech of the user from the second electronic device (and/or the first electronic device) and analyze the data (e.g., using beamforming and/or one or more other spatial filtering processing techniques) to determine the first direction of the user with respect to the second electronic device. Additionally, or alternatively, in some instances, the remote system 104 can receive a message that indicates the first direction from at least one of the first electronic device, the second electronic device, the conferencing system, and/or some other electronic device.

At 1306, the process 1300 associates the second electronic device with a visual indication. For instance, the remote system 104 can associate the second electronic device with a visual indication. The visual indication can include a light color, a light sequence, and/or a light pattern.

At 1308, the process 1300 causes the first electronic device to display the visual indication to indicate the first direction. For instance, the remote system 104 can communicate with the first electronic device to cause the first electronic device to display the visual indication, where the visual indication indicates the first direction. In some instances, communicating with the first electronic device can include sending, to the first electronic device, a message instructing the first electronic device to display the visual indication using at least a first visual indicator that indicates the first direction. In response to receiving the message, the first electronic device can activate the at least the first visual indicator to provide the visual indication.

At 1310, the process 1300 determines a second direction of the user with respect to the second electronic device. In some instances, the remote system 104 can receive additional data representing user speech of the user from the second electronic device (and/or the first electronic device) and analyze the additional data (e.g., using beamforming and/or one or more other spatial filtering processing techniques) to determine the second direction of the user with respect to the second electronic device. Additionally, or alternatively, in some instances, the remote system 104 can receive a message that indicates the second direction from at least one of the first electronic device, the second electronic device, the conferencing system, and/or some other electronic device.

At 1312, the process 1300 causes the first electronic device to display the visual indication to indicate the second direction. For instance, the remote system 104 can communicate with the first electronic device to cause the first electronic device to update the display the visual indication, where the update causes visual indication to indicate the second direction. In some instances, communicating with the first electronic device can include sending, to the first electronic device, a message instructing the first electronic device to update the display the visual indication. In response to receiving the message, the first electronic device can activate, based on the second direction, at least a second visual indicator to provide the visual indication.

It should be noted that, in some instances, the remote system 104 can perform a similar process for one or more other users that are using the second electronic device. For instance, the remote system 104 can identify one or more other users using the second electronic device, associated each user with a respective visual indication, identify a respective direction associated with each user, and then cause the first electronic device to display the respective visual indications based on the respective directions.

Figure 14:
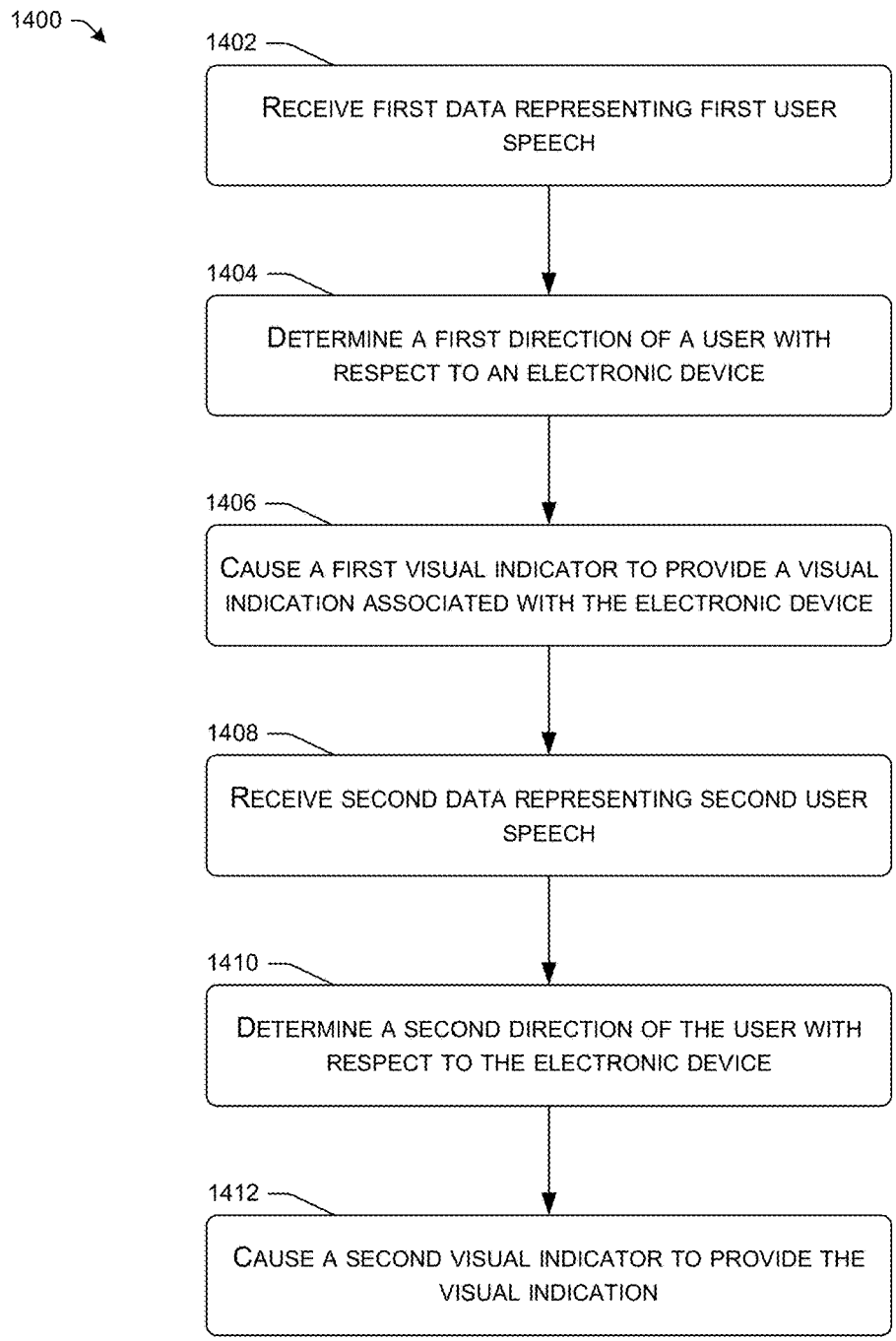
FIG. 14 illustrates a flow diagram of an example process for providing lighting indications that are based on a location of a user with respect to an electronic device.

FIG. 14 illustrates a flow diagram of an example process 1400 for providing lighting indications that are based on a location of a user while communicating with an electronic device. At 1402, the process 1400 receives first data representing first user speech. For instance, an electronic device 102 can receive the first data from at least one of an electronic device, a remote system, or a conferencing system. The first data can include audio data generated by the electronic device. For instance, the electronic device can capture the first user speech from a user and generate the audio data in response.

At 1404, the process 1400 determines a first direction of a user with respect to an electronic device. In some instances, the electronic device 102 can analyze the first data (e.g., using beamforming and/or one or more other spatial filtering processing techniques) to determine the first direction of the user with respect to the electronic device. Additionally, or alternatively, in some instances, the electronic device 102 can receive a message that indicates the first direction from at least one of the electronic device, the remote system, or the conferencing system.

At 1406, the process 1400 causes a first visual indicator to provide a visual indication associated with the electronic device. For instance, the electronic device 102 can activate the first visual indicator to provide the visual indication, where the first visual indicator is selected based on the first direction. In some instances, the electronic device 102 determines to activate the first visual indicator based on the first direction. Additionally, or alternatively, in some instances, the electronic device 102 receives a message that causes the electronic device 102 to activate the first visual indicator. In such instances, the electronic device 102 can receive the message from at least one of the electronic device, the remote system, or the conferencing system.

At 1408, the process 1400 receives second data representing second user speech. For instance, the electronic device 102 can receive the second data from at least one of the electronic device, the remote system, or the conferencing system. The second data can include audio data generated by the electronic device. For instance, the electronic device can capture the second user speech from the user and generate the audio data in response.

At 1410, the process 1400 determines a second direction of a user with respect to the electronic device. In some instances, the electronic device 102 can analyze the second data (e.g., using beamforming and/or one or more other spatial filtering processing techniques) to determine the second direction of the user with respect to the electronic device. Additionally, or alternatively, in some instances, the electronic device 102 can receive a message that indicates the second direction from at least one of the electronic device, the remote system, or the conferencing system.

At 1412, the process 1400 causes a second visual indicator to provide the visual indication. For instance, the electronic device 102 can activate the second visual indicator to provide the visual indication, where the second visual indicator is selected based on the second direction. In some instances, the electronic device 102 determines to activate the second visual indicator based on the second direction. Additionally, or alternatively, in some instances, the electronic device 102 receives a message that causes the electronic device 102 to activate the second visual indicator. In such instances, the electronic device 102 can receive the message from at least one of the electronic device, the remote system, or the conferencing system.

It should be noted that, while the processes 1200 and 1400 above describe determining a location of a single user with respect to a single electronic device, in some instances, similar techniques and processes can be used to determine locations of multiple users with respect to multiple electronic devices. In such instances, the electronic device providing the visual indications can provide a respective visual indication for each user.

Figure 15:
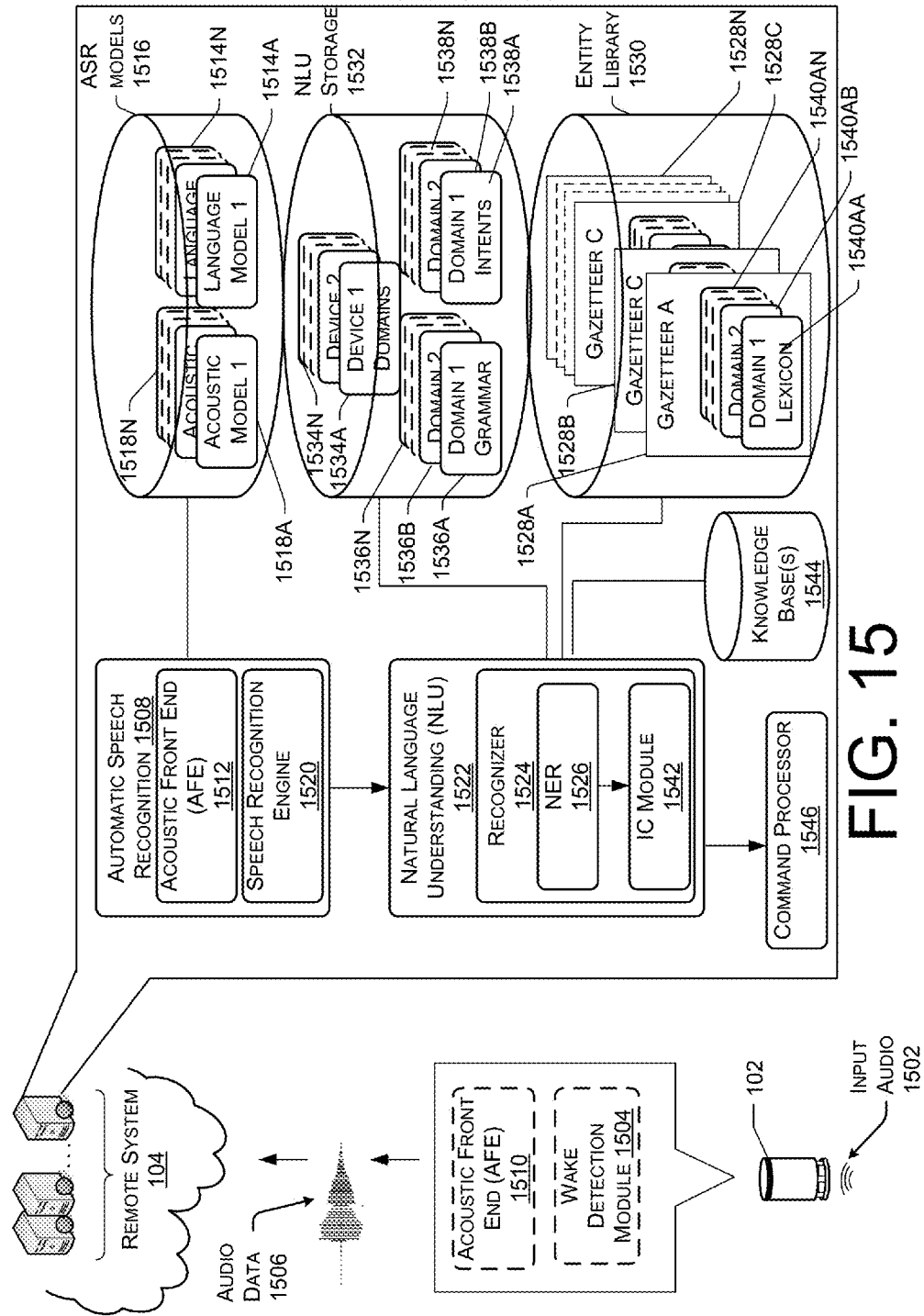
FIG. 15 illustrates a conceptual diagram of components of a speech processing system for processing audio data provided by one or more user devices.

FIG. 15 illustrates a conceptual diagram of how a spoken utterance can be processed, allowing a system to capture and execute commands spoken by a user (e.g., the user 106), such as spoken commands that may follow a wakeword (i.e., a predefined word or phrase for "waking" a device, causing the device to begin sending audio data to a remote system, such as remote system 104). The various components illustrated may be located on a same or different physical devices. Communication between various components illustrated in FIG. 14 may occur directly or across a network 164. An audio capture component, such as a microphone of the electronic device 102, captures audio 1502 corresponding to a spoken utterance. The electronic device 102, using a wakeword detection module 1504, then processes audio data corresponding to the audio 1502 to determine if a keyword (such as a wakeword) is detected in the audio data. Following detection of a wakeword, the electronic device 102 sends audio data 1506 corresponding to the utterance to the remote system 104 that includes an ASR module 1508. The audio data 1506 may be output from an optional acoustic front end (AFE) 1510 located on the device prior to transmission. In other instances, the audio data 1506 may be in a different form for processing by a remote AFE 1510, such as the AFE 1512 located with the ASR module 1508 of the remote system 104.

The wakeword detection module 1504 works in conjunction with other components of the electronic device 102, for example a microphone to detect keywords in audio 1502. For example, the electronic device 102 may convert audio 1502 into audio data, and process the audio data with the wakeword detection module 1504 to determine whether speech is detected, and if so, if the audio data comprising speech matches an audio signature and/or model corresponding to a particular keyword.

The electronic device 102 may use various techniques to determine whether audio data includes speech. Some instances may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other instances, the electronic device 102 may implement a limited classifier configured to distinguish speech from background noise. The classifier may be implemented by techniques such as linear classifiers, support vector machines, and decision trees. In still other instances, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the electronic device 102 (or separately from speech detection), the electronic device 102 may use the wakeword detection module 1504 to perform wakeword detection to determine when a user intends to speak a command to the electronic device 102. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 1504 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another instance, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the electronic device 102 may "wake" and begin transmitting audio data 1506 corresponding to input audio 1502 to the remote system 104 for speech processing. Audio data corresponding to that audio may be sent to remote system 104 for routing to a recipient device or may be sent to the remote system 104 for speech processing for interpretation of the included speech (either for purposes of enabling voice-communications and/or for purposes of executing a command in the speech). The audio data 1506 may include data corresponding to the wakeword, or the portion of the audio data corresponding to the wakeword may be removed by the electronic device 102 prior to sending. Further, a local device may "wake" upon detection of speech/spoken audio above a threshold, as described herein. Upon receipt by the remote system 104, an ASR module 1508 may convert the audio data 1506 into text. The ASR transcribes audio data into text data representing the words of the speech contained in the audio data 1506. The text data may then be used by other components for various purposes, such as executing system commands, inputting data, etc. A spoken utterance in the audio data is input to a processor configured to perform ASR which then interprets the utterance based on the similarity between the utterance and pre-established language models 1514A-N stored in an ASR model knowledge base (ASR Models Storage 1516). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1518A-N stored in an ASR Models Storage 1516), and the likelihood that a particular word which matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 1508 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1512 and a speech recognition engine 1520. The acoustic front end (AFE) 1512 transforms the audio data from the microphone into data for processing by the speech recognition engine 1520. The speech recognition engine 1520 compares the speech recognition data with acoustic models 1518A-N, language models 1514A-N, and other data models and information for recognizing the speech conveyed in the audio data. The AFE 1512 may reduce noise in the audio data and divide the digitized audio data into frames representing a time intervals for which the AFE 1512 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE 1512 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1520 may process the output from the AFE 1512 with reference to information stored in speech/model storage (1516). Alternatively, post front-end processed data (such as feature vectors) may be received by the device executing ASR processing from another source besides the internal AFE. For example, the electronic device 102 may process audio data into feature vectors (for example using an on-device AFE 1510) and transmit that information to a server across a network for ASR processing. Feature vectors may arrive at the remote system 104 encoded, in which case they may be decoded prior to processing by the processor executing the speech recognition engine 1520.

The speech recognition engine 1520 attempts to match received feature vectors to language phonemes and words as known in the stored acoustic models 1518A-N and language models 1514A-N. The speech recognition engine 1520 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 1520 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1520 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 104, for natural language understanding (NLU) processing, such as conversion of the text into commands for execution, either by the user device, by the remote system 104, or by another device (such as a server running a specific application like a search engine, etc.).

The device performing NLU processing 1522 (e.g., the remote system 104) may include various components, including potentially dedicated processor(s), memory, storage, etc. As shown in FIG. 14, an NLU component 1522 may include a recognizer 1524 that includes a named entity recognition (NER) module 1526 which is used to identify portions of query text that correspond to a named entity that may be recognizable by the system. A downstream process called named entity resolution links a text portion to a specific entity known to the system. To perform named entity resolution, the system may utilize gazetteer information (1528A-1528N) stored in entity library storage 1530. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 1508 based on the utterance input audio 1502) and attempts to make a semantic interpretation of the text. That is, the NLU process determines the meaning behind the text based on the individual words and then implements that meaning. NLU processing 1522 interprets a text string to derive an intent or a desired action from the user as well as the pertinent pieces of information in the text that allow a device (e.g., the remote system 104) to complete that action. For example, if a spoken utterance is processed using ASR 1508 and outputs the text "send a message to Joe: Hi Joe, Congratulations . . . " the NLU process may determine that the user intended that the electronic device 102 capture speech of the user for sending, as an audio file, for output on a device of "Joe."

The NLU may process several textual inputs related to the same utterance. For example, if the ASR 1508 outputs N text segments (as part of an N-best list), the NLU may process all N outputs to obtain NLU results.

As will be discussed further below, the NLU process may be configured to parsed and tagged to annotate text as part of NLU processing. For example, for the text "Send a message to Joe," "send a message" may be tagged as a command (to generate an audio file and send it for output) and "to Joe" may be tagged as a specific entity associated with the command.

To correctly perform NLU processing of speech input, an NLU process 1522 may be configured to determine a "domain" of the utterance so as to determine and narrow down which services offered by the endpoint device (e.g., remote system 104 or the electronic device 102) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 1526 receives a query in the form of ASR results and attempts to identify relevant grammars and lexical information that may be used to construe meaning. To do so, the NLU module 1522 may begin by identifying potential domains that may relate to the received query. The NLU storage 1532 includes a database of devices (1534A-N) identifying domains associated with specific devices. For example, the electronic device 102 may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 1524, language model and/or grammar database (1536A-N), a particular set of intents/actions (1538A-N), and a particular personalized lexicon (1540AA-AN). Each gazetteer (1528A-N) may include domain-indexed lexical information associated with a particular user and/or device. For example, the Gazetteer A (1528A) includes domain-index lexical information 1540AA-AN. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) module 1542 parses the query to determine an intent or intents for each identified domain, where the intent corresponds to the action to be performed that is responsive to the query. Each domain is associated with a database (1538a-n) of words linked to intents. For example, a music intent database may link words and phrases such as "quiet," "volume off," and "mute" to a "mute" intent. A voice-message intent database, meanwhile, may link words and phrases such as "send a message," "send a voice message," "send the following," or the like. The IC module 1542 identifies potential intents for each identified domain by comparing words in the query to the words and phrases in the intents database. In some instances, the determination of an intent by the IC module 1542 is performed using a set of rules or templates that are processed against the incoming text to identify a matching intent.

In order to generate a particular interpreted response, the NER 1526 applies the grammar models and lexical information associated with the respective domain to actually recognize a mention one or more entities in the text of the query. In this manner, the NER 1526 identifies "slots" (i.e., particular words in query text) that may be needed for later command processing. Depending on the complexity of the NER 1526, it may also label each slot with a type of varying levels of specificity (such as noun, place, city, artist name, song name, or the like). Each grammar model 1536A-N includes the names of entities (i.e., nouns) commonly found in speech about the particular domain (i.e., generic terms), whereas the lexical information 1540AA-AN from the gazetteer 1528A-N is personalized to the user(s) and/or the device. For instance, a grammar model associated with the shopping domain may include a database of words commonly used when people discuss shopping.

The intents identified by the IC module 1542 are linked to domain-specific grammar frameworks with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar (1536A-N) framework or frameworks may correspond to sentence structures such as "Send a message to {contact}," "Send a voice message to {contact}," "Send the following to {contact}," etc.

For example, the NER module 1526 may parse the query to identify words as subject, object, verb, preposition, etc., based on grammar rules and/or models, prior to recognizing named entities. The identified verb may be used by the IC module 1542 to identify intent, which is then used by the NER module 1526 to identify frameworks. A framework for the intent of "send a message," meanwhile, may specify a list of slots/fields applicable to play the identified "contact" and any object modifier (e.g., specifying a device of the recipient) or the like. The NER module 1526 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 1526 may search the database of generic words associated with the domain (in the knowledge base 1544). So, for instance, if the query was "send message to Joe," after failing to determine a last name for "Joe," the NER component 1526 may search the domain vocabulary for the word "Joe." In the alternative, generic words may be checked before the gazetteer information, or both may be tried, potentially producing two different results.

The output data from the NLU processing (which may include tagged text, commands, etc.) may then be sent to a command processor 1546. The destination command processor 1546 may be determined based on the NLU output. For example, if the NLU output includes a command to send a message, the destination command processor 1546 may be a message sending application, such as one located on the electronic device 102 or in a message sending appliance, configured to execute a message sending command. If the NLU output includes a search request, the destination command processor 1546 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 1522 during runtime operations where NLU operations are performed on text (such as text output from an ASR component 1508). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1524. Each recognizer may include various NLU components such as an NER component 1526, IC module 1542 and other components such as an entity resolver, or other components.

For example, a messaging domain recognizer (Domain A) may have an NER component that identifies what slots (i.e., portions of input text) may correspond to particular words relevant to that domain. The words may correspond to entities such as (for the messaging domain) a recipient. An NER component 1526 may use a machine learning model, such as a domain specific conditional random field (CRF) to both identify the portions corresponding to an entity as well as identify what type of entity corresponds to the text portion. The messaging domain recognizer may also have its own intent classification (IC) component 1542-A that determines the intent of the text assuming that the text is within the proscribed domain. An IC component may use a model, such as a domain specific maximum entropy classifier to identify the intent of the text, where the intent is the action the user desires the system to perform. For this purpose, the remote system 104 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the electronic device 102 and the remote system 104, as illustrated herein are exemplary, and may be located in a stand-alone device or may be included, in whole or in part, as a component of a larger device or system, may be distributed across a network or multiple devices connected by a network, etc.

Figure 16:
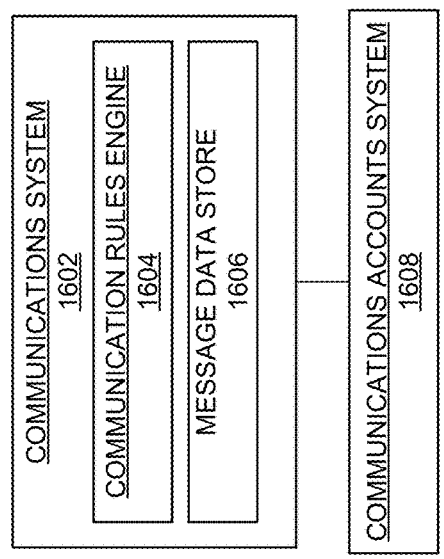
FIG. 16 illustrates a conceptual diagram of components of a messaging system for managing messages for a communal account.

FIG. 16 illustrates a conceptual diagram of components of a messaging system for managing messages for a communal account. A computing system, such the remote system 104, conferencing system 116, electronic device 102, and/or electronic device(s) 118(1)-(N), may include, in a non-limiting instance, a communications system 1602, which may be configured to facilitate communications between two or more electronic devices. For example, communications system 1602 may be capable of facilitating a communications session between device 120 and at least device 122. Upon the remote system 104 (and/or the conferencing system 116) determining that an intent of an utterance is for a communications session to be established with another device, the remote system 104 (and/or the conferencing system 116) may access communications system 1602 to facilitate the communications session between the initiating device and the receiving device. For example, communications system 1602 may employ Voice over Internet Protocol (VoIP) functionality to facilitate audio, image, and/or text data communications between the initiating device and the recipient device.

As an illustrative example, a communications session between two devices is described below to illustrate how the communications session may be established. In one example instance, an individual may speak an utterance (e.g., "Alexa, send a message to John: 'Want to have dinner at my place?'") to their electronic device. In response to detecting the device's wakeword (e.g., "Alexa"), the electronic device may begin sending audio data representing the utterance to the remote system 104 (and/or the conferencing system 116). Upon receipt, automatic speech recognition may be performed, such as speech-to-text processing, to the audio data to generate text data representing the audio data. Natural language understanding techniques, as described with respect to FIG. 15, may be performed to determine an intent of the utterance. If the format of the spoken utterance substantially matches one or more sample utterances corresponding to initiating a communications session, then that may indicate that an intent of the utterance was for a communications session to be initiated. For instance, one example sample utterance may be "{Wakeword}, send a message to {Contact Name}: {Message}." If the spoken utterance's text data substantially matches this sample utterance's framework, then the remote system 104 (and/or the conferencing system 116) may determine that the intent of the utterance was to start a communications session with a contact of the user, and may also determine that the intended target of the communications session is "John" (e.g., {Contact Name}: John). After determining that a message is to be sent to a contact named "John," communications system 1602 may access communications accounts system 1608 to determine a device identifier (e.g., a device address) associated with the contact, "John."

In some instances, communications system 1602 may establish a communications session between an initiating device and a recipient device using one or more VoIP protocols including, but not limited to SIP, RTP, RTCP, SRTP, and SDP. In one illustrative instance, a SIP signaling command may be provided to communications system 1602 for communicating with the recipient device. In particular, PJSIP functionality adds a new "user-to-user" header that indicates the device pair for the communications session.

In one instance, communications system 1602 may include a communication rules engine 1604. Communications rules engine 1604 may store various rules for how certain communications between communal accounts and user accounts are to behave. For example, communications rules engine 1604 may store communications routing information and instructions for how different messages may be sent from one device to another device depending on a variety of parameters including, but not limited to, if the sender device is a shared device, if the recipient device is a shared device, if the sender device is a personal device, if the recipient device is a personal device, if there are any personal and/or shared devices associated with the sender device and/or recipient device, and/or whether or not speaker identification was able to positively identify a speaker. In one illustrative instance, communication rules engine 1604 may store a communications table indicating various device identifiers, group account identifiers, communication identifiers, and device types for various devices interacting with communications system 1602, as described in greater detail below with reference to FIG. 17.

In some instances, communications system 1602 may also include a message data store 1606. Message data store 1606, in a non-limiting instance, may correspond to any suitable type of storage/memory capable of storing one or more messages sent/received. For example, when an individual sends a message (e.g., "Want to have dinner at my place?") from their communal device to another communal device, that message may be stored by communications system 1602 using message data store 1606. In some instances, message data store 1606 may be structured to store audio data representing audio message, video data representing video messages, image data representing image messages, text data representing text messages, and/or message notification metadata. When an individual utters a request to receive messages received for their user account and/or communal account, communications system 1602 may access message data store 1606 to obtain those messages, and may send the appropriate message data (e.g., audio, video, image, text, etc.) to the corresponding requesting device (e.g., personal device, communal device). In some instances, message data store 1606 may store each message with a corresponding communications identifier, communal account identifier, user account identifier, and/or device identifier with which that message is directed to. For example, if a first individual sends an audio message to a second individual, audio data representing that audio message may be stored by message data store 1606 with a communal account identifier associated with the second individual's corresponding communal account, as stored by communications accounts system 1608. This way, when an individual requests to receive messages associated with their communal account, message data store 1606 may be accessed to obtain any messages currently stored thereby that are associated with that communal account's communal account identifier.

Communications rules engine 1604 may employ several communications rules for messages sent/received to/from one or more participants. First, a device type of the sending device may be determined. For example, a determination may be made as to whether or not a device identifier associated with the device that the audio data representing an utterance, which includes a message to be sent to another individual's device, is associated with a communal device. Next, a determination may be made as to whether or not a speaker that spoke the utterance was able to be identified. Using these two parameters, for instance, communications rules engine 1604 may be configured to cause communications system 1602 to facilitate communications between two or more devices.

Communications accounts system 1608 may also store one or more communal accounts corresponding to one or more shared devices. For example, a communal device, such as device 124, may have its own communal account stored on communications accounts system 1608. The communal account may be associated with the communal device, and may also be linked to one or more individual's user accounts and/or profiles. For example, communal device 124 may be associated with a first communal account corresponding to a first grouping of individuals (e.g., a family). One or more user accounts may also be associated with the first communal account (e.g., individual members of the family), corresponding to individuals that may be capable of interacting with communal electronic device 124. Information, settings, and/or preferences, for example, for each user account may be stored within a user account database.

FIG. 17 is an illustrative diagram of an exemplary communications table, in accordance with various instances. Communications table 1700, in a non-limiting instance, includes entries 1702-1714. Each entry may indicate a device identifier, a communal account identifier, a communication identifier, and a device type associated with a communication that is received or a communication to be sent. In some instances, each instance of a communication that is intended to be sent from one device to another device may result in a new entry added to communications table 1700. However, persons of ordinary skill in the art will recognize that upon receiving a communication from a device, additional entries may not be required, and the entry associated with a device's particular device identifier may be stored for any suitable amount of time by communications system 1602.

Device identifiers, as illustrated by communications table 1700, may correspond to any suitable identification means for a device that may interact with communications system 1602. Various types of device identifiers may include, but are not limited to, media access control ("MAC") identifiers, serial numbers, internet protocol ("IP") addresses, global positioning addresses, telephone numbers, messaging identifiers, and the like. As an illustrative example, when the electronic device 102 of FIG. 1 sends audio data representing an utterance to the remote system 104 (and/or the conferencing system 116), that audio data may be received with a device identifier unique to electronic device 102 (e.g., device identifier of row 1702: "111.xxx"). Each device identifier, in one instance, is unique to that particular device with which it is associated with. Therefore, no two device identifiers should be identical, however persons of ordinary skill in the art will recognize that it is possible for two device identifiers to be the same.

A communal account identifier may correspond to an identifier that indicates a particular communal account on remote system 104 (and/or the conferencing system 116), which may be stored by communications accounts system 1608, that a corresponding device identifier is associated with. For example, as seen by entry 1702, a device may have a device identifier 111.xxx, which may be associated with a communal account identifier 111.yyy. The communal account identifier may include multiple device identifiers, indicating that each corresponding device associated with one of those device identifiers is part of a same communal account. For example, entry 1704 may correspond to a device identifier 222.xxx, but may also correspond to the communal account identifier 111.yyy. This may indicate that a first device corresponding to entry 1702 and a second device corresponding to entry 1704 are both associated with a same group account (e.g., group account identifier 111.yyy). Similarly, entry 1706 may also indicate that another device, having device identifier 333.xxx, is also associated with the same communal account as the first and second devices associated with entries 1702 and 1704. Further still, entries 1708, 1710, and 1712 may also be associated with a same communal account, corresponding to communal account identifier 111.bbb, which differs from communal account identifier 111.yyy.

In some instances, each device identifier may also have an associated communication identifier. A communications identifier may be any suitable type of identifier used for identifying a participant of a communication. As an illustrative example, entry 1702 may indicate that a first device associated with device identifier 111.xxx has a communications identifier 111.zzz In some instances, the communications identifier may be configurable by a user of an associated device. For example, the communications identifier may be any suitable alphanumeric string of numbers, letters, and/or characters, that allow an individual to identify themselves when they send a message to, or receive a message from, another individual.

Also stored by communications table 1700 may be a device type associated with each device entry into table 1700. For example, communications table 1700 may indicate whether a device corresponding to a particular device identifier is a communal device or a mobile device. In one instance, a mobile device may be considered to be a personal device in that it is typically associated with a particular individual.

When audio data representing an utterance is received, a device identifier may also be received, either with the audio data (e.g., part of a header of the audio data), or separately (e.g., metadata received in addition to the audio data). Upon receiving the device identifier, communications system 1602 may determine an entry within communications table 1700 matching that device identifier. After determining the device identifier, a corresponding communal identifier for that device identifier may also be determined, and a determination of whether or not that device is a communal device may occur.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

It is noted that, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
one or more computer-readable media storing instructions that, when executed by the one or more processors, cause the one or more processors to perform operations comprising:
receiving, from one or more computing devices, a first message indicating that a first electronic device has connected to a conference call;
receiving, from the one or more computing devices, a second message indicating that a second electronic device has connected to the conference call;
associating the second electronic device with a first visual indication;
sending, to the first electronic device, a third message that causes the first electronic device to display, using a light ring, the first visual indication;
receiving, from the one or more computing devices, a fourth message indicating that a third electronic device has connected to the conference call;
associating the third electronic device with a second visual indication;
sending, to the first electronic device, a fifth message that causes the first electronic device to concurrently display, using the light ring, the second visual indication with the first visual indication;

receiving, from the one or more computing devices, a sixth message indicating that the first electronic device has disconnected from the conference call; and sending, to the first electronic device, a seventh message that causes the first electronic device to stop displaying the first visual indication and the second visual indication.

2. The system as recited in claim 1, the operations further comprising:

opening a communication channel with the one or more computing devices, wherein the receiving the first message indicating that the first electronic device has connected to the conference call comprises receiving, from the one or more computing devices via the communication channel, data indicating that the first electronic device has connected to a communication session associated with the conference call.

3. The system as recited in claim 1, the operations further comprising:

analyzing, using voice recognition, audio data representing user speech from the second electronic device; and determining, based at least in part on the analyzing the audio data, that the audio data represents first speech from a first user and second speech from a second user, wherein the associating the second electronic device with the first visual indication includes associating the first user with a third visual indication and associating the second user with a fourth visual indication, and wherein the sending the third messages that causes the first electronic device to display, using the light ring, the first visual indication comprises sending, to the first electronic device, the third message that causes the first electronic device to concurrently display, using the light ring, the third visual indication and the fourth visual indication.

4. The system as recited in claim 1, wherein the light ring has a circular shape with a radius, and wherein the sending the fifth message that causes the first electronic device to concurrently display, using the light ring, the second visual indication with the first visual indication comprises:

sending, to the first electronic device, the fifth message that causes the first electronic device to concurrently display, using the light ring, the first visual indication using a first portion of a circumference of the light ring and display the second visual indication using a second portion of the circumference of the light ring.

5. A method comprising:

receiving, by a system and from one or more computing devices, first data indicating that an electronic device is sending and receiving synchronous audio communications with two or more participants of a conference call;

associating, by the system, a first participant of the two or more participants with a first visual indication;

sending, by the system and to the electronic device, second data that causes the electronic device to display, using a light ring, the first visual indication;

associating, by the system, a second participant of the two or more participants with a second visual indication; and sending, by the system and to the electronic device, third data that causes the electronic device to display, using the light ring, the second visual indication concurrently with the first visual indication.

6. The method as recited in claim 5, further comprising:
receiving audio data that represents sound;

analyzing the audio data using voice recognition; and determining, based at least in part on the analyzing the audio data, that the audio data represents at least first user speech from the first participant and second user speech from the second participant.

7. The method as recited in claim 5, wherein the electronic device comprises a first electronic device, and wherein the method further comprises receiving fourth data indicating that the first participant includes a first electronic device and the second participant includes a second electronic device.

8. The method as recited in claim 5, wherein the sending the third data that causes the electronic device to display, using the light ring, the second visual indication concurrently with the first visual indication comprises concurrently sending, to the electronic device:

the second data that causes a first light emitter of the light ring emit first light associated with the first visual indication; and the third data that causes a second light emitter of the light ring to emit second light associated with the second visual indication.

9. The method as recited in claim 5, wherein the light ring has a circular shape with a radius, and wherein the sending the third data that causes the electronic device to display, using the light ring, the second visual indication concurrently with the first visual indication comprises:

sending, to electronic device, the third data that causes the electronic device to display the first visual indication using a first portion of a circumference of the light ring and display the second visual indication using a second portion of the circumference of the light ring.

10. The method as recited in claim 5, wherein:

the associating the first participant with the first visual indication comprises associating the first participant with at least one of a first light color, a first light sequence, or a first light pattern; and the associating the second participant with the second visual indication comprises associating the second participant with at least one of a second light color, a second light sequence, or a second light pattern.

11. The method as recited in claim 5, further comprising:

storing a profile associated with the electronic device, the profile indicating at least a first contact associated with the first participant and a second contact associated with the second participant;

determining, based at least in part on the profile, that the first contact is associated with the first visual indication; and determining, based at least in part on the profile, that the second contact is associated with the second visual indication.

12. The method as recited in claim 5, further comprising:

receiving audio data that represents user speech from the first participant; and analyzing the audio data to determine a direction at which the first participant is located from an additional electronic device, wherein the sending the second data that causes the electronic device to display, using light ring, the first visual indication comprises sending, to the electronic device, the second data that causes the electronic device to display, using the light ring, the first visual indication such that the first visual indication indicates the direction.

13. The method as recited in claim 12, wherein the audio data comprises first audio data, the sound comprises first sound, and the direction comprises a first direction, and wherein the method further comprises:

receiving second audio data that represents user speech from the first participant;

analyzing the second audio data to determine a second direction at which the first participant is located from the additional electronic device; and sending, to the electronic device, fourth data that causes the electronic device to display, using the light ring, the first visual indication such that the first visual indication indicates the second direction.

14. A device comprising:
a light ring;
at least one microphone;
at least one speaker;
one or more processors; and
one or more computer-readable media storing instructions that, when executed by the one or more processors, cause the one or more processors to perform operations comprising:

receiving, from a first remote system, first audio data associated with a first participant;

outputting, using the at least one speaker, first audible sound represented by the first audio data;

receiving, from at least one of the first remote system or a second remote system, first display data associated with the first participant;

causing at least a first portion of the light ring to provide a first visual indication represented by the first display data;

receiving, from the first remote system, second audio data associated with a second participant;

outputting, using the at least one speaker, second audible sound represented by the second audio data;

receiving, from at least one of the first remote system or a second remote system, second display data associated with the second participant; and causing at last a second portion of the light ring to provide a second visual indication represented by the second display data concurrently with the first portion of the light ring providing the first visual indication.

15. The device as recited in claim 14, wherein:
the causing the at least the first portion of the light ring to provide the first visual indication associated with the first participant comprises causing a first portion of a circumference of the light ring to display the first visual indication; and
the causing the at least the second portion of the light ring to provide the second visual indication associated with the second participant comprises causing a second portion of the circumference of the light ring to display the second visual indication.

16. The device as recited in claim 14, wherein:
the causing the at least the first portion of the light ring to provide the first visual indication comprises causing the light ring to display the first visual indication as rotating around the light ring; and
the causing the at least the second portion of the light ring to provide the second visual indication comprises causing the light ring to display the second visual indication as rotating around the light ring concurrently with the first visual indication.

17. The device as recited in claim 14, wherein:
the first visual indication comprises at least one of a first color, a first light sequence, or a first light pattern that is associated with the first participant; and
the second visual indication comprises at least one of a second color, a second light sequence, or a second light pattern that is associated with the participant.

18. The device as recited in claim 14, wherein the first audio data and the second audio data are further associated with an electronic device, and wherein the operations further comprise:

analyzing, using voice recognition, the first audio data;
determining that the first audio data represents first user speech from the first participant;
analyzing, using voice recognition, the second audio data; and
determining that the second audio data represents second user speech from the second participant.

19. The device as recited in claim 14, the operations further comprising:

analyzing the first audio data to determine a first direction of the first participant with respect to a first electronic device, wherein the first portion of the light ring is associated with the first direction; and analyzing the second audio data to determine a second direction of the second participant with respect to the first electronic device or a second electronic device, wherein the second portion of the light ring is associated with the second direction.

20. The device as recited in claim 14, the operations further comprising:

receiving first directional data indicating a first direction of the first participant with respect to a first electronic device, wherein the first portion of the light ring is associated with the first direction; and receiving second directional data indicating a second direction of the second participant with respect to the first electronic device or a second electronic device, wherein the second portion of the light ring is associated with the second direction.

* * * * *

UNITED STATES PATENT AND TRADEMARK OFFICE
CERTIFICATE OF CORRECTION

PATENT NO. : 10,148,912 B1
APPLICATION NO. : 15/633122
DATED : December 4, 2018
INVENTOR(S) : Brian Alexander Oliver et al.

Page 1 of 1

It is certified that error appears in the above-identified patent and that said Letters Patent is hereby corrected as shown below:

In the Claims

Column 42, Line 29, change "electronic device to display" to --electronic device to concurrently display--.

Signed and Sealed this
Second Day of July, 2019

Andrei Iancu
*Director of the United States Patent and Trademark Office*